(12) United States Patent
Agetsuma et al.

(10) Patent No.: US 9,152,506 B2
(45) Date of Patent: Oct. 6, 2015

(54) MANAGEMENT APPARATUS AND MANAGEMENT METHOD

(71) Applicant: Hitachi, Ltd., Tokyo (JP)

(72) Inventors: Masakuni Agetsuma, Yokohama (JP); Takaki Nakamura, Ebina (JP); Hitoshi Kamei, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/807,599

(22) PCT Filed: Sep. 20, 2012

(86) PCT No.: PCT/JP2012/074104
§ 371 (c)(1),
(2) Date: Dec. 28, 2012

(87) PCT Pub. No.: WO2014/045376
PCT Pub. Date: Mar. 27, 2014

(65) Prior Publication Data
US 2014/0310556 A1  Oct. 16, 2014

(51) Int. Cl.
*G06F 11/00* (2006.01)
*G06F 11/14* (2006.01)
*G06F 11/20* (2006.01)
*G06F 13/00* (2006.01)
*G06F 13/10* (2006.01)
*G06F 11/07* (2006.01)

(52) U.S. Cl.
CPC ............ *G06F 11/1458* (2013.01); *G06F 11/07* (2013.01); *G06F 11/2056* (2013.01); *G06F 13/00* (2013.01); *G06F 13/10* (2013.01)

(58) Field of Classification Search
CPC ............ G06F 11/2056; G06F 11/2058; G06F 11/2069
See application file for complete search history.

(56) References Cited

U.S. PATENT DOCUMENTS 7,031,984 B2 * 4/2006 Kawamura et al. ................. 1/1
2010/0064168 A1 * 3/2010 Smoot et al. .................. 714/6

* cited by examiner

*Primary Examiner* — Bryce Bonzo
*Assistant Examiner* — India Davis
(74) *Attorney, Agent, or Firm* — Foley & Lardner LLP

(57) ABSTRACT

Management apparatus and method to prevent a drop in the service quality of data. In a computer system which replicates and holds data which is stored in a storage apparatus by a communication terminal in other storage apparatuses, physical position information of the storage apparatuses and the communication terminal is collected and, at the time of the disaster recovery processing, a storage apparatus for which the data of the secondary system is to be switched to the primary system is selected from among the storage apparatuses which hold the data of the secondary system on the basis of physical position information in a first predetermined period among the collected physical position information of the communication terminal, and a policy preconfigured for the data, and an instruction is issued to the selected storage apparatus to switch the data of the secondary system held by the storage apparatus to the primary system.

17 Claims, 18 Drawing Sheets

FIG.8

| TIME | USER | GPS INFORMATION | ACCESS PATH |
|---|---|---|---|
| 2012/08/31 13:01 | A | 038.258375,140.855829 | /home/A |
| 2012/08/31 15:15 | B | 038.258375,140.855829 | /home/B |
| 2012/08/31 15:30 | A | 038.261620,140.866136 | /home/A |
| 2012/08/31 16:12 | A | 038.258360,140.866200 | /home/B |
| 2012/08/31 17:10 | B | 038.251881,140.855829 | /home/B |
| . . . | . . . | . . . | . . . |

| DR PATH | PRIMARY SYSTEM | SECONDARY SYSTEM | ACL INFORMATION | DR DATE | POLICY ID | PRIORITY | USED CAPACITY | USED NW BANDWIDTH |
|---|---|---|---|---|---|---|---|---|
| /home/A | S2 | S3, S4 | A:rw, B:r | 2012/08/07 | P1 | 1 | 8GB | 0.2MB/SEC |
| /home/B | S3 | S2, S5 | A:rw, B:rw | 2012/08/07 | P2 | 3 | 2GB | 0.1MB/SEC |
| /public | S5 | S4 | everyone:rw | — | P4, P3 | 2 | 500GB | 5MB/SEC |

| ID | UPDATE TIME | IP ADDRESS | GPS INFORMATION | MAXIMUM CAPACITY | USED CAPACITY | MAXIMUM NW BANDWIDTH | USED NW BANDWIDTH |
|---|---|---|---|---|---|---|---|
| S1 | 2012/08/31 17:00 | 133.144.14.1 | 038.258375,140.866136 | 8192GB | 3000GB | 100MB/SEC | 25MB/SEC |
| S2 | 2012/08/31 18:00 | 133.144.14.2 | 038.261620,140.856698 | 4096GB | 2000GB | 100MB/SEC | 5MB/SEC |
| S3 | 2012/08/31 18:01 | 133.144.14.3 | 038.251881,140.855829 | 4096GB | 1500GB | 100MB/SEC | 10MB/SEC |
| S4 | 2012/08/31 18:02 | 133.144.14.4 | 038.254200,140.855332 | 1024GB | 600GB | 10MB/SEC | 5MB/SEC |
| S5 | 2012/08/31 18:01 | 133.144.14.5 | 038.272100,140.834212 | 1024GB | 850GB | 10MB/SEC | 5MB/SEC |
| 86A | 86B | 86C | 86D | 86E | 86F | 86G | 86H |

FIG.11

| ID | POLICY CONTENT | ADDITIONAL INFORMATION |
|---|---|---|
| P1 | NEAR USER | — |
| P2 | NEAR USER WITH HIGH ACCESS FREQUENCY | — |
| P3 | DESIGNATED STORAGE | MANAGEMENT COMPUTER |
| P4 | DESIGNATED STORAGE | S5 |

87A  87B  87C  87

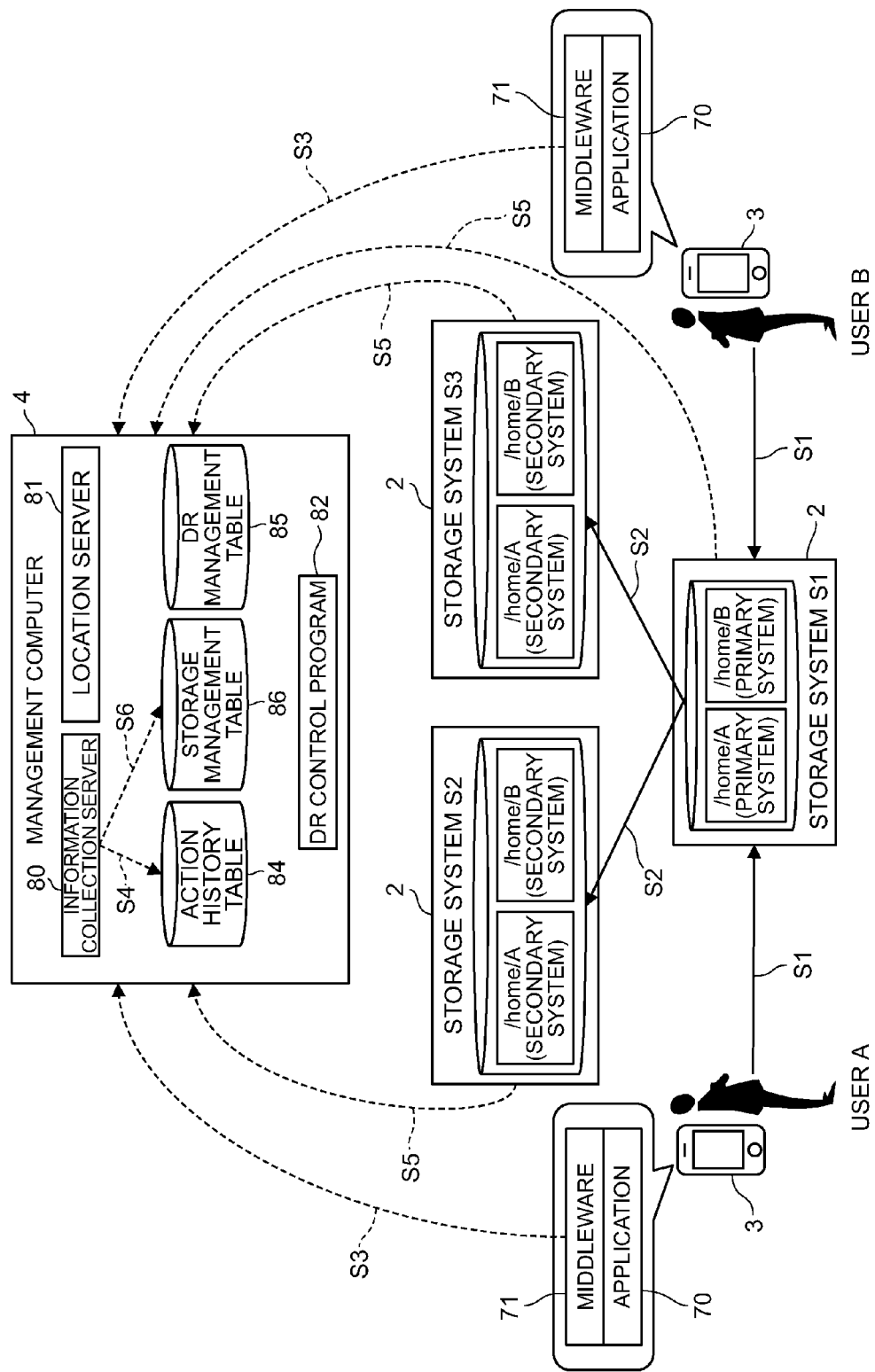

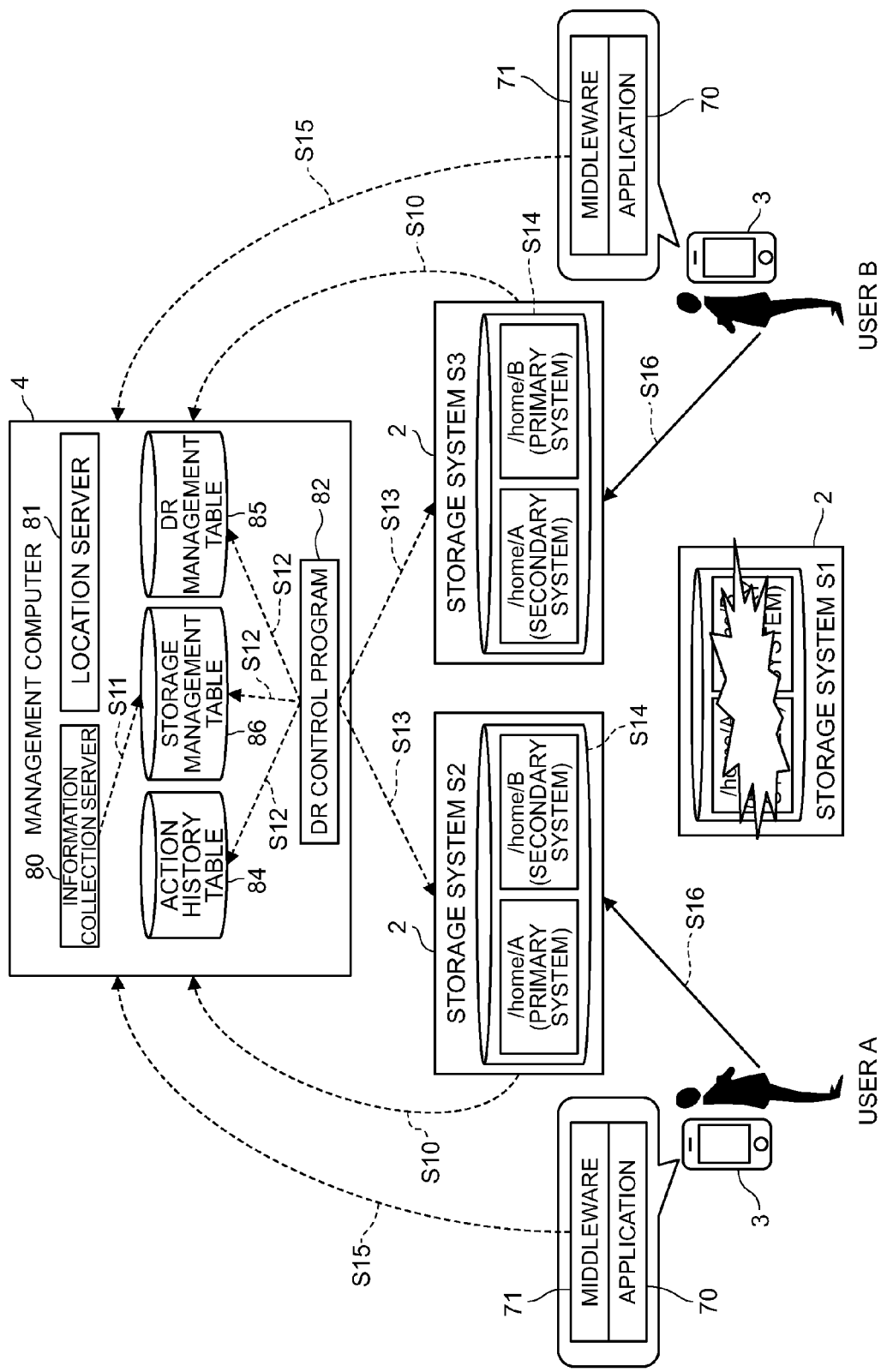

MANAGEMENT APPARATUS AND MANAGEMENT METHOD

TECHNICAL FIELD

The present invention relates to a management apparatus and a management method, and is suitably applied to a management apparatus which manages a computer system which replicates and holds data, which is stored in a storage apparatus by a communication terminal, in one or more other storage apparatuses in units of the data, for example.

BACKGROUND ART

Conventionally, a disaster recovery function exists as one of the data protection functions in a computer system (see PTL 1 and PTL 2, for example). A disaster recovery function is a function enabling data communication services to be continued by means of another storage system which is spared from a disaster even if a fault occurs with the storage system as a result of the disaster by copying, and shared possession of, the data stored in the storage system between a plurality of storage systems.

More specifically, supposing that a storage system which is used for normal data access is called a "primary storage system" and a storage system which is used when a fault arises in the primary storage system is called a "secondary storage system," during normal times, the data is copied to the secondary storage system synchronously or asynchronously to the data writing to the primary storage system. Such data copying from a primary storage system to a secondary storage system is called replication.

Furthermore, if a fault occurs in the primary storage system as a result of a disaster, a secondary storage system in which a fault has not been generated switches to the primary storage system. The act of switching from the secondary storage system to the primary storage system is known as disaster recovery.

CITATION LIST

Patent Literature

[PTL 1]
Japanese Published Laid Open Patent Application No. H11-085408
[PTL 2]
Japanese Published Laid Open Patent Application No. 2005-292952

SUMMARY OF INVENTION

Technical Problem

Further, if a plurality of secondary storage systems exist in a computer system in which the foregoing disaster recovery function is installed, there is a problem in that the quality of service of data communication services drops depending on the selection of the secondary storage system which is switched to the primary system, and situations arise where users are unable to access the service themselves.

For example, if a secondary storage system which is installed overseas becomes the primary storage system due to disaster recovery, the access latency of domestic users increases. Further, even if a secondary storage system with a domestic installation is switched to the primary storage system, in a state where a fault arises in a specific communication line (regional network/mobile communication base station) due to a disaster, the user is not able to access the storage system.

The present invention was conceived in view of the above points and hence a management apparatus and management method are proposed which make it possible to effectively prevent a drop in the service quality of data communication services after disaster recovery and effectively prevent situations from arising where users are unable to access services.

Solution to Problem

In order to achieve the foregoing object, the present invention provides a management apparatus which manages a computer system which comprises a plurality of storage apparatuses and which replicates and holds data, which is stored by a communication terminal in the storage apparatuses, in one or more of the other storage apparatuses, comprising an information collection portion which collects physical position information of the plurality of storage apparatuses and the communication terminal; and a disaster recovery controller which monitors the existence of faults in the storage apparatuses which hold the data of a primary system and, upon detecting a fault in the storage apparatuses, issues an instruction to the storage apparatus which holds the data of a secondary system which is a replication of the data of the primary system to execute disaster recovery processing to switch the data of the secondary system to the primary system, wherein, at the time of the disaster recovery processing, the disaster recovery controller selects the storage apparatus for which the data of the secondary system is to be switched to the primary system from among the storage apparatuses which hold the data of the secondary system on the basis of the physical position information in a first predetermined period among the physical position information of the communication terminal which is collected by the information collection portion, and a policy which has been preconfigured for the data, and issues an instruction to the selected storage apparatus to switch the data of the secondary system held by the storage apparatus to the primary system.

In addition, the present invention provides a management method which is executed by a management apparatus which manages a computer system which comprises a plurality of storage apparatuses and which replicates and holds data, which is stored by a communication terminal in the storage apparatuses, in one or more of the other storage apparatuses, the management method comprising a first step in which the management apparatus collects physical position information of the plurality of storage apparatuses and the communication terminal; and a second step in which the management apparatus monitors the existence of faults in the storage apparatuses which hold the data of a primary system and, upon detecting a fault in the storage apparatuses, issues an instruction to the storage apparatus which holds the data of a secondary system which is a replication of the data of the primary system to execute disaster recovery processing to switch the data of the secondary system to the primary system, wherein, in the second step, at the time of the disaster recovery processing, the management apparatus selects the storage apparatus for which the data of the secondary system is to be switched to the primary system from among the storage apparatuses which hold the data of the secondary system on the basis of the physical position information in a first predetermined period among the collected physical position information of the communication terminals, and a policy which has been preconfigured for the data, and issues an instruction to the selected storage apparatus to switch the data of the secondary system held by the storage apparatus to the primary system.

As a result, with the management apparatus and management method, disaster recovery can be performed on the optimal storage apparatus in data units on the basis of the position information and policy of each communication terminal.

Advantageous Effects of Invention

With the present invention, a management apparatus and management method can be realized which make it possible to effectively prevent a drop in the service quality of data communication services after disaster recovery and effectively prevent situations from arising where users are unable to access the services themselves.

BRIEF DESCRIPTION OF DRAWINGS

FIG. 8 is a conceptual diagram showing a configuration example of an action history table.

FIG. 9 is a conceptual diagram showing a configuration example of a disaster recovery management table.

FIG. 10 is a conceptual diagram showing a configuration example of a storage management table.

FIG. 11 is a conceptual diagram showing a configuration example of a policy management table.

FIG. 12A is a schematic diagram showing an overview of normal operation of the computer system.

FIG. 12B is a schematic diagram showing an overview of the operation at the time of a fault of the computer system.

DESCRIPTION OF EMBODIMENTS

An embodiment of the present invention will be described hereinbelow with reference to the drawings.

Hereinafter, descriptions and drawings will be suitably omitted and simplified in order to provide clarity to the description. The present invention is not limited to this embodiment and so-called practical examples falling within the spirit of the present invention are included in the technological scope of the invention. There are no particular restrictions and there may be one or more of each of the constituent elements.

In the following description, various information may be described by the expression "xxx table", for example, but various information may also be expressed with data structures other than tables. In order to show that the various information is not dependent on data structures, "xxx table" may be called "xxx information."

The management system can be configured by one or more computers. For example, if information is processed and displayed by a management computer, the management computer is the management system. If the same functions as a management computer are realized by a plurality of computers, for example, the plurality of computers (may include a display computer if a display computer generates a display) are the management system. In this embodiment, a management computer is the management system.

In the following description, the processing is sometimes described with "program" as the subject, but the program performs specified processing by suitably using storage resources (memory, for example) and/or a communication interface device (communication port, for example) as a result of the program being executed by a processor (CPU (Central Processing Unit), for example), and hence the subject of the processing may also be the processor. As a result of operating according to the program, the processor operates as function sections for realizing predetermined functions. The apparatus and system comprising the processor is an apparatus and system which comprises these function sections.

The processing which is described with the program or processor as the subject can be described with a computer (a storage system, a management computer, a client, or a host) as the subject. The processor may comprise a hardware circuit which performs all or part of the processing performed by the processor. The computer program may be installed in each computer from a program source. The program source may be a program distribution server (management computer, for example) or a storage medium, for example.

(1) Configuration of Computer System According to this Embodiment

Figure 1:
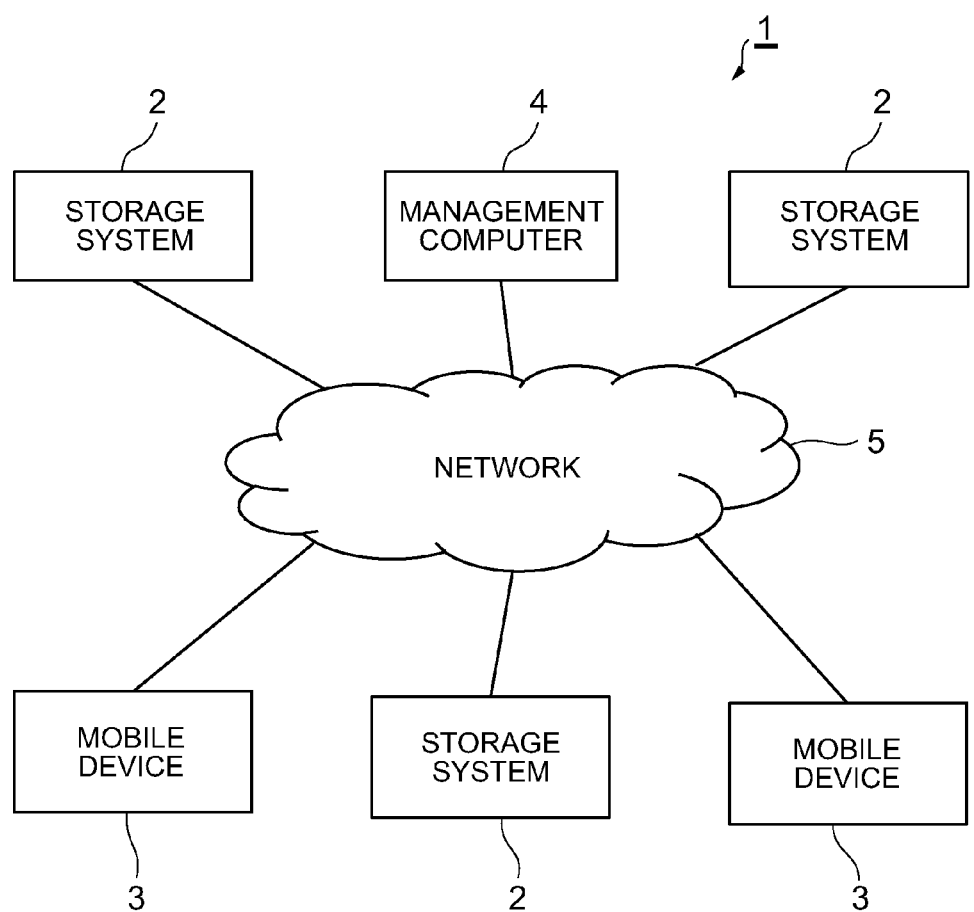
FIG. 1 is a block diagram showing the overall configuration of a computer system according to this embodiment.

In FIG. 1, 1 indicates the overall computer system according to this embodiment. This computer system 1 comprises a plurality of storage systems 2, one or more mobile devices 3, and one or more management computers 4, and is configured by interconnecting same via a network 5.

The storage system 2 is storage which is capable of processing data communication protocols of a plurality of types, and which performs data communication between the mobile devices 3 and the management computer 4 by using, for example, NFS (Network File System), CIFS (Common Internet File System), FTP (File Transfer Protocol), HTTP (Hyper Text Transfer Protocol) and/or other communication protocols which provide file sharing services.

The storage system 2 receives an I/O request from a mobile device 3 via a network 5 and sends back a processing result to the mobile device 3 via the network 5. Further, the storage system 2 receives an instruction from the management computer 4 and changes the configuration of its own storage system in accordance with this instruction.

In addition, the storage system 2 comprises a replication function for replicating data stored in its own storage system to another storage system 2 via the network 5. This replication is executed synchronously or asynchronously to an I/O request to its own storage system 2 or at regular intervals or at times instructed by the management computer 4.

Note that the storage system 2 may be of a type that is fixedly installed at a site such as a data center or may be of a type subject to changes in geographical position such as a movable container-type storage system, for example.

If a fault arises in a certain storage system 2 due to a disaster such as an earthquake, a tsunami, or a fire, a switch is made to the replication destination storage system 2 and the data communication services to the mobile devices 3 are restarted. The storage system 2 performs switching processing of the storage system 2 at the moment when instructed to do so by the management computer 4, for example, or the storage systems 2 which escape the disaster perform communications and perform the switching processing autonomously.

The network 5 is configured from a communications network such as the Internet, a LAN (Local Area Network), a WAN (Wide Area Network), a SAN (Storage Area Network), a public wireless LAN or a cellular phone communications network, for example. Hereinafter, the network 5 is constructed from networks of a plurality of types such as a data communication SAN and a management information communication LAN.

The mobile devices 3 are configured from portable communication devices such as a cellular phones including smartphones, tablet-type communication terminals, or laptop computers, for example. Communication devices of a plurality of types may exist as mobile devices 3. Further, mobile devices 3 are not limited to communication devices carried by people or other living things, rather, communication devices for which geographical movement is generated as a result of being installed on a moving body such as an automobile may also be applied.

The management computer 4 is a computer device which comprises information processing resources such as a CPU and memory, and is configured from a personal computer, a workstation, or a mainframe, or the like, for example. However, a general-purpose computer, a cellular phone, a tablet-type communication terminal, or a laptop computer or the like may also be adopted as the management computer 4.

Figure 2:
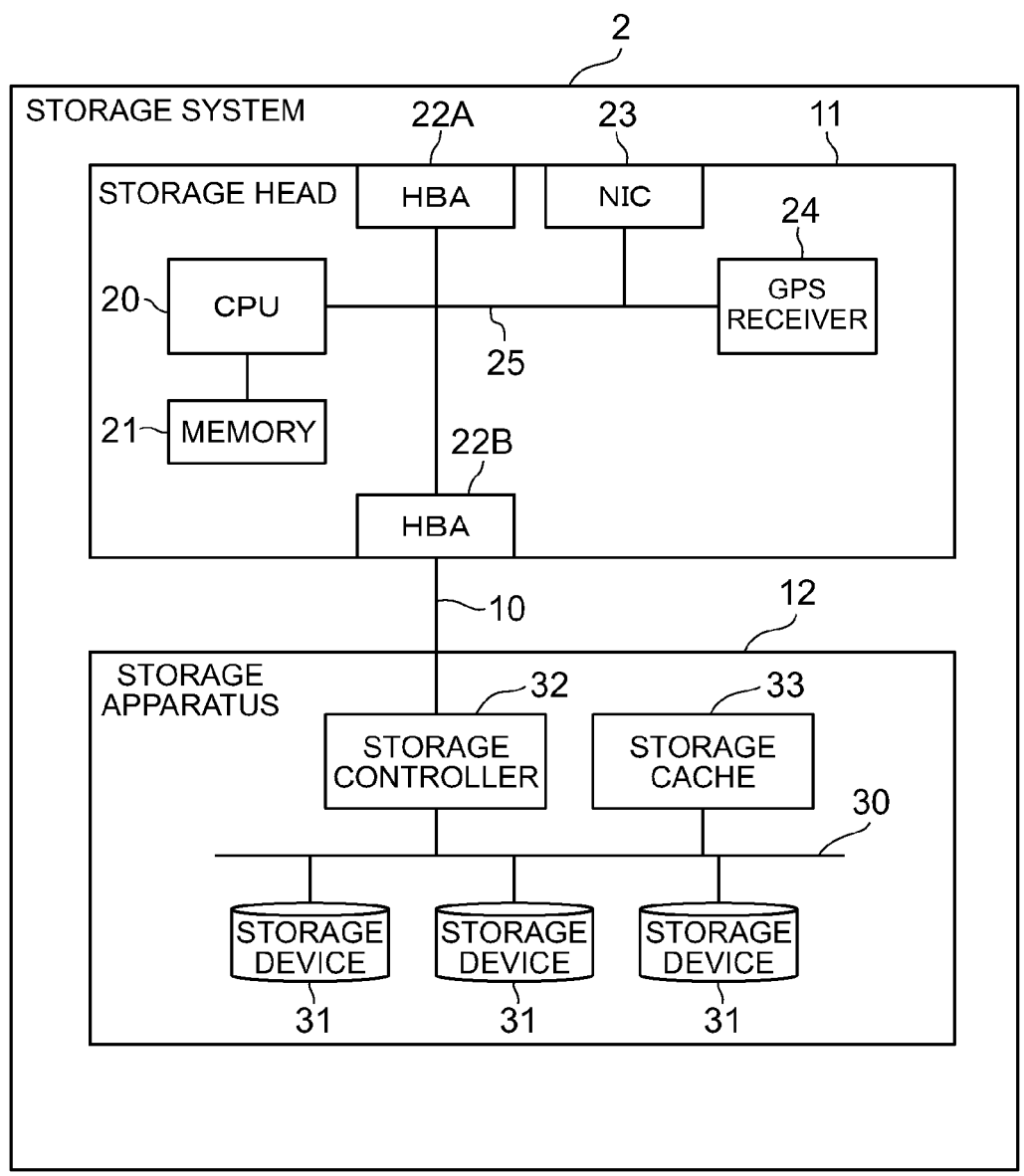
FIG. 2 is a block diagram showing a hardware configuration of a storage system.

FIG. 2 shows a schematic configuration of the storage system 2. The storage system 2 is configured from a storage head 11 and a storage apparatus 12 which are connected via a communication path 10 comprising a Fibre channel. Note that an Ethernet (registered trademark), for example, other than Fibre channel can also be adopted as the communication path 10.

The storage head 11 comprises a function for managing and controlling data I/Os to and from the storage apparatus 12 and is configured comprising a CPU 20, a memory 21, first and second HBAs (Host Bus Adaptors) 22A, 22B, an NIC (Network Interface Card) 23, and a GPS (Global Positioning System) receiver 24 which are interconnected via an internal bus 25.

The CPU 20 is a processor which governs the overall operational control of the storage head 11. Further, the memory 21 is mainly used to store the computer programs and other data. As a result of the CPU 20 executing the computer programs stored in the memory 21, the various operations of the storage head 11 overall are executed. Note that a cache area which temporarily stores data received from the mobile devices 3 and data transmitted to the mobile devices 3 may also be installed in the memory 21. Further, storage devices of other types may also be adopted instead of or in addition to the memory 21.

The first HBA 22A and the NIC 23 are interfaces with the network 5 (FIG. 1). The first HBA 22A is connected to a data communication SAN or the like which comprises the network 5 and the NIC 23 is connected to a management information communication LAN which comprises the network 5. The second HBA 22B is configured from a HBAcard or the like, for example, and is connected to the storage apparatus 12. Note that a communication interface of a different type may also be adopted in place of the NIC 23 in addition to the first and second HBA 22A and 22B.

The GPS receiver 24 is a device which receives signals which are emitted by each of a plurality of GPS satellites and calculates its own current physical position on the basis of the received signals. Note that a position information acquisition device of another type may also be used in addition to or in place of the GPS receiver 24. For example, the storage system 2 may contain a wireless LAN device and may measure physical position information of the storage system 2 from the position information of a wireless LAN access point installed nearby. Further, the storage system 2 may contain a cellular phone receiver and may measure position information of the storage system 2 from antenna position information of a cellular phone communication network installed nearby. In addition, a configuration may also be adopted in which a system administrator manually supplies the storage head 11 with position information. Note that in the case of a storage system of a type which is installed fixedly at a site such as a data center as described earlier, the physical position information may also be stored in memory or the like instead of in a GPS or the like.

The storage apparatus 12 is a storage apparatus which stores and holds programs and files which are used by the storage head 11 and which comprises a plurality of storage devices 31, a storage controller 32, and a storage cache 33, which are connected via an internal bus 30.

The storage devices 31 are configured, for example, from high-cost disk devices such as SCSI (Small Computer System Interface) disks, or low-cost disk devices such as SATA (Serial AT Attachment) disks, or from SSD (Solid State Drives) or other semiconductor devices.

The storage devices 31 are operated using a RAID (Redundant Arrays of Inexpensive Disks) system by means of the storage controller 32. One or more logical volumes (hereinafter called logical volumes) are configured on physical storage areas which are provided by one or more storage devices 31. Further, the data is stored in the logical volumes by taking blocks (called logical blocks hereinbelow) of a predetermined size as the units.

Unique identifiers (hereinafter called LU (Logical Unit numbers)) are assigned to each of the logical volumes. In the case of this embodiment, the data I/Os from the storage head 11 are issued in logical block units for which addresses, obtained by combining a number ((LBA (Logical Block Address)) which is assigned to each logical block and unique to the logical block with the LU, are assigned.

Note that a tape archive or an optical disk library of DVDs or CDs or the like, for example, may be adopted as the storage devices 31. If a tape library or optical disk library is used, there is an advantage in that, even though the I/O performance drops in comparison with when SSDs or hard disk devices are used, the cost per bit can be reduced.

The storage controller 32 is a processor unit which governs the overall operational control of the storage apparatus 12 and is configured comprising information processing resources such as a CPU (Central Processing Unit) and memory. Further, the storage cache 33 is used in order to temporarily hold data which is input/output to/from the storage device 31. The storage controller 32 is able to communicate with the storage head 11, and read and write data from and to the storage device 31 while using the storage cache 33 in accordance with a request from the storage head 11. A portion of the storage cache 33 may also be configured from a low-speed storage device.

Note that, in the case of this embodiment, the respective numbers of storage head 11 and the storage apparatus 12 in the storage system 2 are not limited to one, rather, a plurality of the storage head 11 and the storage apparatus 12 may be provided. Further, the configuration may also be such that a plurality of storage heads 11 are connected to one storage apparatus 12. Further, the communication path 10 between the storage heads 11 and storage apparatuses 12 may also be configured from a switch. In addition, the numbers of the storage devices 31, storage controller 32, and the storage cache 33 in the storage apparatus 12 are not restricted to the numbers shown in FIG. 2.

Further, for reasons such as increasing the speed, redundancy, and higher reliability, the storage controller 32 of the storage apparatus 12 may provide a plurality of storage devices 31 to the storage head(s) 11 as one or more accessible virtual disk devices (more specifically, RAID technology is used).

Figure 3:
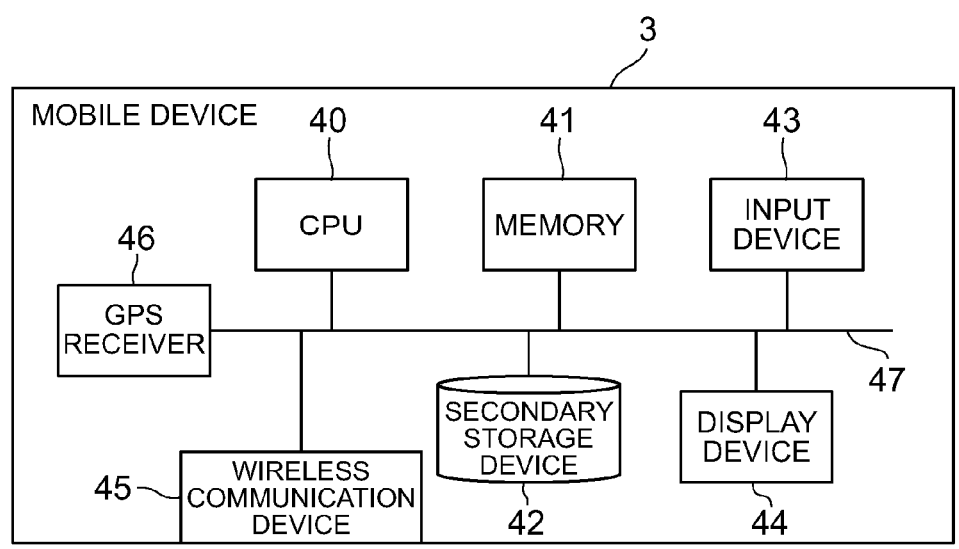
FIG. 3 is a block diagram showing a hardware configuration of a mobile device.

As shown in FIG. 3, the mobile devices 3 are configured comprising a CPU 40, a memory 41, a secondary storage device 42, an input device 43, a display device 44, a wireless communication device 45, a GPS receiver 46, and an internal bus 47 which interconnects the foregoing devices and receiver 46.

The CPU 40 is a processor which governs the overall operational control of the mobile devices 3. Further, the memory 41 is used as a working memory of the CPU 40. The secondary storage device 42 is configured from a nonvolatile storage device with a larger capacity than the memory 41 which is a flash memory, SSD or hard disk device or the like and is mainly used to hold computer programs and data and the like.

The computer programs stored in the secondary storage device 42 are loaded into the memory 41 and, as a result of the CPU 40 executing these computer programs, the various processing of the mobile devices 3 is executed. For example, the mobile devices 3 access the data communication services of the storage system 2 in accordance with user instructions.

The input device 43 is a device which is used when the system administrator inputs commands and information and is configured from a keyboard and a pointing device, and the like, for example. Further, the display device 44 is a device for visually displaying information and is configured from a liquid-crystal display, for example.

The wireless communication device 45 is configured from at least one or more wireless devices among wireless devices such as a wireless LAN device, a cellular phone receiver, and a WiMAX (Worldwide Interoperability for Microwave Access) wireless device. However, a wired communication device such as an NIC may also be provided instead of or in addition to the wireless communication device 45.

The GPS receiver 46 is a device which comprises the same functions as a GPS receiver 24 (FIG. 2) which is installed on the storage head 11 (FIG. 2) of the storage system 2 and is used to acquire physical position information representing the current positions of the mobile devices 3. In addition to or in place of the GPS receiver 46, a position information acquisition device of a different type which detects the position of the cellular phone devices 3 may also be applied. For example, if the mobile devices 3 contain a wireless LAN device, the physical position information of the mobile devices 3 may also be estimated from the position information of a wireless LAN access point installed nearby. Further, if the mobile device 3 contains a cellular phone receiver, the physical position information of the mobile devices 3 may also be estimated from position information of an antenna in a cellular phone communications network which is installed nearby.

Note that a storage device of another type may also be adopted in place of at least one of the memory 41 and the secondary storage device 42, and that a touch panel which integrates the functions of the input device 43 and the display device 44 may also be adopted in place of the input device 43 and the display device 44.

Figure 4:
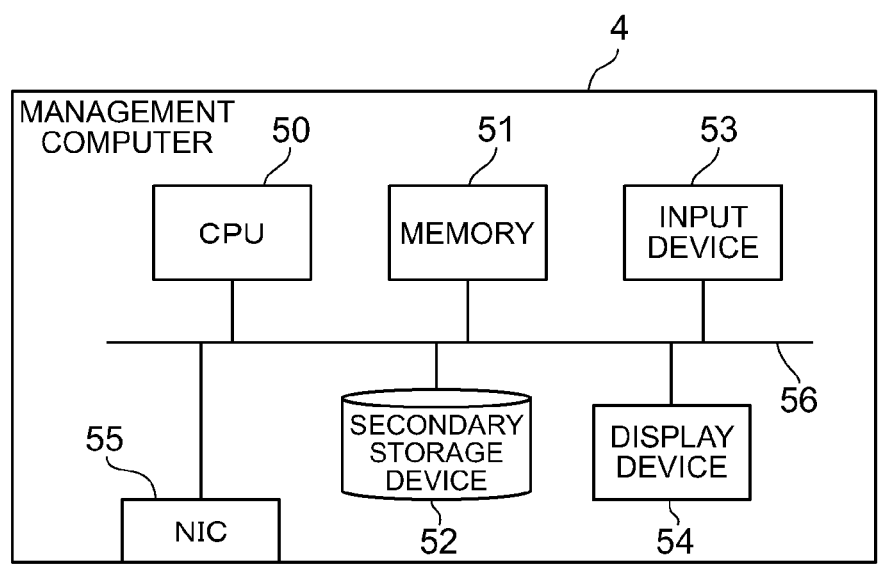
FIG. 4 is a block diagram showing a hardware configuration of a management computer.

The management computer 4 is configured from a computer device such as a personal computer, work station or mainframe, for example, and, as shown in FIG. 4, comprises a CPU 50, a memory 51, a secondary storage device 52, an input device 53, a display device 54, and an NIC 55, and an internal bus 56 which interconnects same.

The CPU 50 is a processor which governs the overall operational control of the management computer 4. Further, the memory 51 is configured from a volatile semiconductor memory, for example, and is used as a working memory of the CPU 40. The secondary storage device 52 is configured from a hard disk device or a large-capacity nonvolatile storage device such as an SSD, for example, and is mainly used to hold computer programs and data.

The computer programs stored in the secondary storage device 52 are loaded into the memory 51 and, as a result of the CPU 40 executing these computer programs, the various processing of the management computer 4 overall is executed. For example, the management computer 4 issues a disaster recovery instruction to the storage system 2 in accordance with the operation by the system administrator and acquires information relating to the state of the storage system 2 and to the access logs and so on of the mobile devices 3.

The input device 53 is a device which is used when the system administrator inputs commands and information and is configured from a keyboard and a pointing device, or the like, for example. Further, the display device 54 is a device for visually displaying various information and is configured from a liquid-crystal display, for example. The NIC 55 is an interface with the network 5 (FIG. 1) and is configured from a LAN card, for example.

Note that a storage device of another type may also be adopted in place of at least one of the memory 51 and the secondary storage device 52. Further, a communication interface device of another type may also be adopted in place of the NIC 55.

(2) Configuration of Computer Program and Management Table Group

Figure 5:
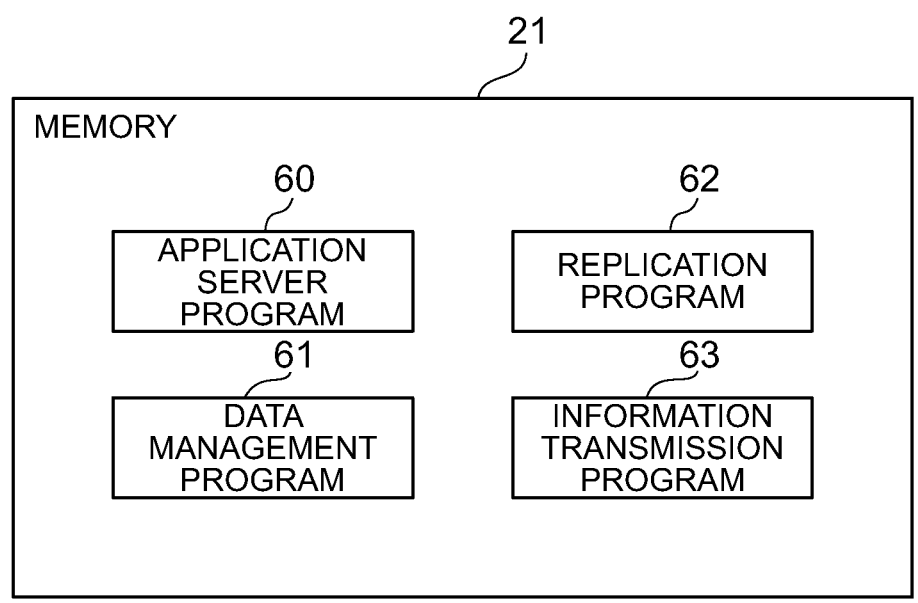
FIG. 5 is a block diagram showing a configuration of a group of computer programs in a storage head.

FIG. 5 shows a group of computer programs which are stored in the memory 21 of the storage head 11 in the storage system 2 according to this embodiment. As shown in FIG. 5, the memory 21 of the storage head 11 stores an application server program 60, a data management program 61, a replication program 62, and an information transmission program 63 which are loaded from a secondary storage device (not shown) in the storage head 11 or from the storage apparatus 12.

The application server program 60 is a program which uses a communication protocol such as NFS, CIFS, FTP, or HTTP to provide data communication services to the mobile devices 3. The application server program 60 issues an I/O request for the data stored in the storage apparatus 12 (FIG. 2) to the data management program 61 in accordance with requests from the mobile devices 3.

The data management program 61 is a program which performs management of data which is stored in the storage apparatus 12 and is configured from a file system, a database, or a KVS (Key Value Store), for example. The data management program 61 processes I/Os for the data on the basis of requests from the application server program 60.

The replication program 62 is a program which executes replication processing which replicates (copies) data managed by the data management program 61 to the other storage system 2. The replication program 62 executes replication processing synchronously or asynchronously to the data communication processing of the application server program 60. Note that it is possible to shorten the latency time of data communications between the mobile devices 3 and the application server program 60 by executing the replication processing asynchronously to the data communication processing of the application server program 60.

The information transmission program 63 is a program which collects information such as the maximum capacity, used capacity, and current position and so on from each of the storage systems 2 at regular intervals and which transmits the collected information to the management computer 4.

Figure 6:
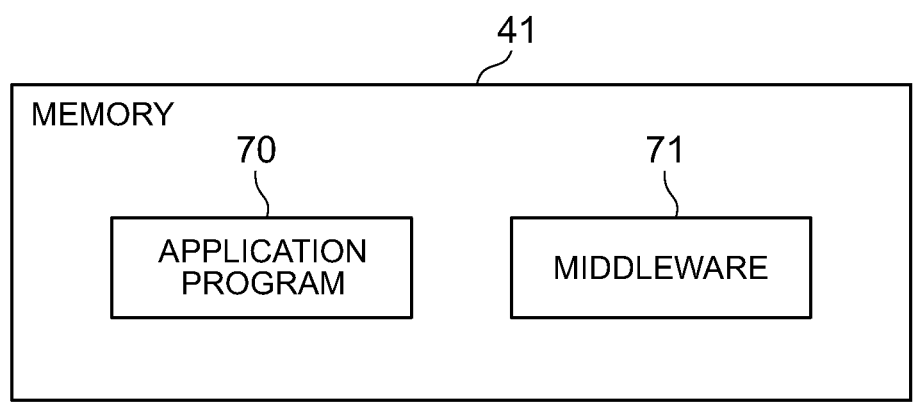
FIG. 6 is a block diagram showing a configuration of a group of computer programs in the mobile device.

Meanwhile, FIG. 6 shows a group of computer programs which are stored in the memory 41 of the mobile devices 3. As shown in FIG. 6, the application program 70 and the middleware 71 are stored in the memory 41 of the mobile devices 3.

The application program 70 is a program which accesses the desired file or directory by performing data communications with the application server program 60 (FIG. 5) of the storage head 11 in the storage system 2. As the application program 70, a browser, an NFS client, a CIFS client, an FTP client or a WebDAV (Distributed Authoring and Versioning protocol for the WWW) client or the like can be adopted, for example. As the application program 70, not only an application program which directly accesses data held by the storage system 2, but also an application program which receives the result of the processing and shaping, by the storage system 2, of the data held by the storage system 2 can be adopted.

The middleware 71 is a computer program which is subordinate to the application program 70. The middleware 71 provides a basic I/O interface to the application program 70. When the application program 70 issues an I/O request to the application server program 60 (FIG. 5), the middleware 71 searches for a storage system 2 which holds an access target primary file or directory from a location server program 81 (FIG. 7) of the management computer 4, described subsequently, via an I/O request from the application program 70 and issues an I/O request to the application server program 60 of the storage system 2. Note that, as a result of the middleware 71 caching the information of the storage system 2, the number of inquiries to the location server program 81 can be reduced.

When an I/O request is issued, the middleware 71 acquires the current time from a timer (not shown), acquires position information (GPS information) from the GPS receiver 46 (FIG. 3), creates information (an access log) indicating which file or directory was accessed and at what time and where by its own mobile device 3, and records the access log thus created in an access log file (not shown) which is stored in the memory 41 or the secondary storage device 42. Further, the middleware 71 transmits the access log recorded in the access log file at regular intervals to the management computer 4.

Note that, in this embodiment, the structure is such that the main body part of the application (application program 70) and the base part (middleware 71) which issues inquiries to the location server program 81 of the management computer 4, records access logs, and makes transmissions to the management computer 4 are separate modules; however, for example, explicitly, a function for issuing inquiries to the location server program 81 transmitting the access logs to the management computer 4 may also be provided in the application program 71 and the middleware 70 may be omitted.

Furthermore, according to this embodiment, although the middleware 71 transmits access logs at regular intervals to the management computer 4 but the middleware 71 may transmit access logs to the management computer 4 each time access is made by the application program 70, for example.

Figure 7:
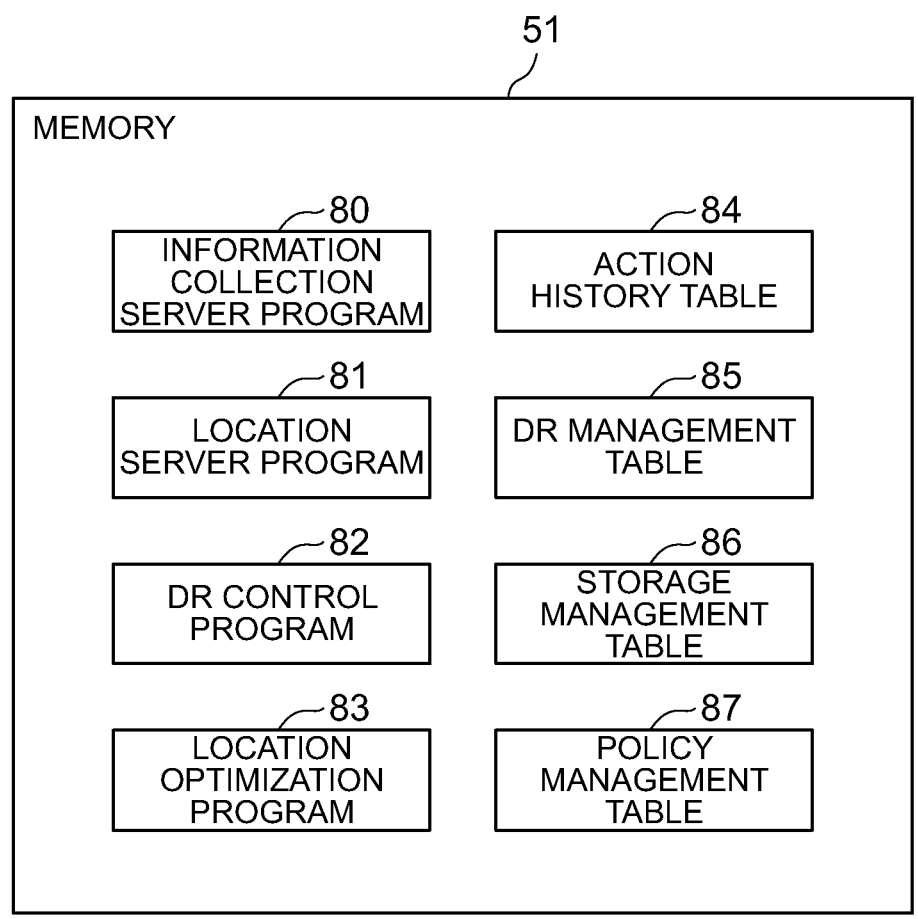
FIG. 7 is a block diagram showing the configuration of a computer program group and a data group in a management computer.

Meanwhile, FIG. 7 shows a computer program group and a management table group which are stored in the memory of the management computer 4. As shown in FIG. 7, the memory 51 of the management computer 4 stores a computer program group which is configured from an information collection server program 80, a location server program 81, a disaster recovery control program 82, and a location optimization program 83, and a management table group which is configured from an action history table 84, a disaster recovery management table 85, a storage management table 86, and a policy management table 87.

The information collection server program 80 is a program which collects information relating to each storage system 2 and each mobile device 3. The information collection server program 80 stores information, such as the maximum capacity, used capacity, and current position of the storage system 2 which are transmitted from the information transmission program 63 (FIG. 5) of each storage system 2, in the storage management table 86, as will be described subsequently, and stores the access logs, which are transmitted from the middleware 71 of each mobile device 3, in the action history table 84 as will be described subsequently.

The location server program 81 is, according to this embodiment, a program which manages in which the storage system 2 the primary and secondary data of files or directories which are disaster recovery units are respectively stored. Further, the location server program 81 reads IP addresses and position information and the like of the storage system 2, in which primary and secondary data of inquiry target files or directories are stored, from the disaster recovery management table 85 which will be described subsequently in accordance with inquiries from the middleware 71 (FIG. 6) of the mobile devices 3 and the replication program 62 (FIG. 5) of the storage system 2, and sends back the read information to the inquiry source.

The disaster recovery control program 82 is a program which monitors the existence of faults in the storage system 2 and, upon detecting a fault in the storage system 2, executes disaster recovery processing to instruct disaster recovery (switching from the secondary system to the primary system) on the storage system 2 which holds the secondary file or directory. Details of the disaster recovery processing will be subsequently provided.

The location optimization program 83 is a program which verifies, at regular intervals, whether location of a file or directory which has undergone disaster recovery is optimally placed for the user and, if necessary, executes location optimization processing to perform optimization by switching between the primary system and secondary system of the file or directory. Details of the location optimization processing will be described subsequently.

The action history table 84 is a table which is used to manage access logs which are transmitted at regular intervals from the mobile devices 3 as described subsequently and which, as shown in FIG. 8, is configured from a time field 84A, a user name field 84B, a GPS information field 84C, and an access path field 84D. Entries (rows) in the action history table 84 each correspond to one of the access logs which appear Timeline.

Further, the time field 84A for each entry stores the time when a mobile device 3 accesses a file or directory held by a particular storage system 2, and the user name field 84B stores the user names of the users who access the file or the directory. Further, the GPS information field 84C stores the geographical position information of the mobile devices 3 (GPS information represented by the latitude and longitude) at the time the corresponding users access the corresponding files or directories, and the access path field 84D stores the path names of the files or directories accessed by the corresponding users.

Therefore, in the case of FIG. 8, it can be seen that access was made to the file or directory with the path name "/home/A" by the mobile device 3 of a user "A" at "13:01 on 2012/08/31" in a location with a north latitude "0.38.258375" and an east longitude "140.855829".

Note that, although decimal degrees (DD) form have been adopted as the form of the GPS information for position information in this embodiment, forms other than decimal degrees may also be adopted such as degrees-minutes-seconds (DMS), for example.

According to this embodiment, the disaster recovery management table 85 is a table which is used to manage the correspondence relationship between the files or directories which are units for realizing disaster recovery and the primary and secondary storage systems 2 which hold the files or directories and is created by the management computer 4.

As shown in FIG. 9, the disaster recovery management table 85 is configured from a disaster recovery path field 85A, a primary system field 85B, a secondary system field 85C, an ACL information field 85D, a disaster recovery date field 85E, a policy ID field 85F, a priority field 85G, a used capacity field 85H, and a used network bandwidth field 85I. Note that the entries (rows) in the disaster recovery management table 85 each correspond to one file or directory.

Further, the disaster recovery path field 85A of each entry stores the path name of the path to the corresponding file or directory of the disaster recovery unit. Furthermore, the primary system field 85B stores identifiers (storage system IDs) which are unique to the storage systems 2 which are assigned to the storage systems 2 which hold primary data of the files or directories, and the secondary system field 85C stores storage system IDs of all the storage systems 2 which hold secondary data of the files or directories. The storage system IDs of each of the storage systems 2 which hold the data of the primary or secondary files or directories are managed by using the storage management table 86 (FIG. 10) which will be described subsequently.

Further, the ACL information field 85D stores information (hereinafter called ACL information) indicating which access rights have been assigned to which user for the corresponding file or directory. For example, in FIG. 9, "A:rw" indicates that the rights to both reading "(r)" and writing "(w)" of the corresponding files or directories have been assigned to user "A". Further, in FIG. 9, "everyone:rw" indicates that the rights to both reading "(r)" and writing "(w)" of the corresponding files or directories have been assigned to all the users ("everyone").

The disaster recovery date field 85E stores the date if disaster recovery of the corresponding file or directory has been executed, and the policy ID field 85F stores identifiers (policy IDs). Note that "policy" as it is intended here means the selection policy when selecting a secondary storage system 2 which is the disaster recovery destination when there is a fault with the storage system 2 which holds the primary data of the disaster recovery unit files or directories. In the case of this embodiment, a plurality of policies are prescribed for this selection policy, and the policy IDs of one or more policies which are pre-configured by the system administrator in the corresponding files or directories are stored in the policy ID field 85F. If a plurality of policies have been designated, a secondary storage system which is to be the disaster recovery destination is determined by performing an evaluation in the designated order.

The priority field 85G stores the priorities which indicate the priority level when the corresponding files or directories under disaster recovery. If a plurality of files or directories undergo disaster recovery, the smaller the value of the priority, the higher the priority assigned to disaster recovery of the files or directories. The highest priority value is "1" and the priority drops as this value increases.

The used capacity field 85H stores the current usage amount (data size) of the corresponding file or directory and the used network bandwidth field 85I stores the data transfer bandwidth when data of the corresponding files or directories is uploaded (transferred) from the mobile device 3 to the primary storage system 2.

Therefore, in the case of FIG. 9, it can be seen that the files or directories which are accessible via the disaster recovery path "/home/A" are stored in the storage system "S2" as the primary data, are stored in two storage systems "S3" and "S4" as the secondary data, the rights ("rw") to read and write have been assigned to the user "A" and only the right ("r") to read has been assigned to user "B".

Further, in FIG. 9, it can be seen that a policy "P1" has been configured as the policy when performing disaster recovery on the files or directories and that disaster recovery was performed on "2012/08/07". Further, it can seen in FIG. 9 that the files or directories have "1" configured as the priority at the time of disaster recovery, the data size is "8 GB", the network bandwidth which is used when uploading from the mobile devices 3 to the primary storage system 2 is "0.2 MB/sec" on average.

Note that, according to this embodiment, ACL information is used as access control information but the invention of this specification is not restricted to this [ACL information]. For example, access control may be performed with UNIX (registered trademark) permissions. Further, only the dates are managed if disaster recovery of the corresponding files or directories is executed in this embodiment, but the times may also be managed.

The storage management table 86 is a table which is used to manage information such as position information (GPS information), the maximum capacity, the used capacity, the maximum network bandwidth, and the used network bandwidth of the storage system 2 which is transmitted at regular intervals from each of the storage systems 2 and, as shown in FIG. 10, is configured from a storage system ID field 86A, an update time field 86B, an IP address field 86C, a GPS information field 86D, a maximum capacity field 86E, a used capacity field 86F, a maximum network bandwidth field 86G, and a used network bandwidth field 86H. Each of the entries (rows) in the storage management table 86 respectively corresponds to one storage system 2.

Further, the storage system ID field 86A of each entry stores the storage system ID of the corresponding storage system 2 and the update time field 86B stores the time when the storage information was last notified by the corresponding storage system 2.

Furthermore, the IP address field 86C stores the IP addresses for control and data access of the corresponding storage system 2, the GPS information field D stores geographical position information (GPS information expressed by the latitude and longitude) of the storage system 2. Further, the maximum capacity field 86E stores the maximum capacity of the corresponding storage system 2 and the used capacity field 86F stores the current used capacity of the storage system 2.

In addition, the maximum network bandwidth field 86G stores the maximum data transfer bandwidth (maximum permissible network bandwidth to upload) for when data is uploaded from the mobile devices 3 to the corresponding storage systems, and the used network bandwidth field 86H stores the data transfer bandwidth (used network bandwidth) in the upload direction which the storage systems 2 use at such time.

Therefore, in the case of FIG. 10, it can be seen that, for the storage system 2 called "S1", storage information is notified by the storage system 2 to the management computer 4 at "2012/08/31 17:00", the IP address of this storage system 2 is "133.144.14.1", and the position of the storage system 2 when the storage information is notified is a north latitude "38.258375" and an east longitude "140.866136". It can also be seen that the storage system 2 has already used "3000 GB" of the maximum capacity "8192 GB" and that "100 MB/sec" of the maximum network bandwidth (maximum permissible network bandwidth to upload) in the upload direction which is "25 MB/sec" has already been used.

Note that, according to this embodiment, the IP address, GPS information, the maximum capacity, the maximum network bandwidth, and used network bandwidth of the storage system 2 serve as storage information of each of the storage systems 2 which are managed using the storage management table 86, but information such as the CPU load and/or disk I/O bandwidth of the storage system 2, for example, is collected and the collected information is stored and saved in the storage management table 86 and may be used as reference information when selecting the storage system 2 which is to be the disaster recovery destination, and so on.

Further, although decimal degrees (DD) form have been adopted as the form of the GPS information for position information in this embodiment, forms other than decimal degrees may also be adopted such as degrees-minutes-seconds (DMS), for example.

The policy management table 87 is a table which is used to manage the selection policy when selecting the secondary storage system 2 which is to be the disaster recovery destination when disaster recovery is executed and, as shown in FIG. 11, is configured from a policy ID field 87A, a policy content field 87B, and an additional information field 87C. Each entry (row) of the policy management table 87 respectively corresponds to one policy.

Further, the policy ID of the corresponding policy is stored in the policy ID field 87A of each entry and the policy content field 87B stores the specific content of the corresponding policy. Further, the additional information field 87C stores added information (additional information) relating to the corresponding policy.

For example, in FIG. 11, the policy called "P1" represents a policy according to which the storage system 2 which is disposed "near the user" is selected as a disaster recovery destination. Note that, if "P1" is selected as a policy, when a plurality of users access a disaster recovery target file or directory, a storage system 2 which is nearby at an intermediate point to the users is selected as the disaster recovery destination.

Furthermore, a policy called "P2" represents a policy for selecting a storage system 2 which is disposed "close to the user with the highest access frequency" among a plurality of users which access the disaster recovery target file or directory as the disaster recovery destination.

In addition, a policy called "P3" represents a policy for fixedly selecting an apparatus which is designated in the additional information stored in the additional information field 87C as the disaster recovery destination ("designated storage"). Note that, in this embodiment, the storage system 2 and the management computer 4 can be designated as the disaster recovery destination. The policy called "P3" exemplifies a case where "the management computer" is designated as the disaster recovery destination.

Likewise, a policy called "P4" represents a policy for fixedly selecting an apparatus which is designated in the additional information stored in the additional information field 87C as the disaster recovery destination ("designated storage"). According to the policy "P4", a storage system 2 called "S5" is designated as the disaster recovery destination.

A combination of a plurality of these policies can be configured. For example, in the disaster recovery management table 85 exemplified in FIG. 9, "P4" and "P3" are configured as policies for files or directories which are accessible by a disaster recovery path called "/public". This means that, although the storage system 2 called "S5" is first designated as the disaster recovery destination, if disaster recovery of the storage system "S5" is not possible due to a fault or the like, the management computer 4 is to be temporarily designated as the disaster recovery destination.

If the management computer 4 is used as a temporary disaster recovery destination (the management computer 4 is used as a storage system), though not shown in FIG. 7, the application server program 60 (FIG. 5), the data management program 61, the replication program 62, and the information transmission program 63 mentioned earlier with reference to FIG. 5 and held by the storage system 2 are stored in the memory 51 of the management computer 4.

Note that, although four kinds of policies, namely, "P1" to "P4", are defined in FIG. 11, the present invention is not limited to these policies. Less than four types or five or more types of policies may be prepared as policies; for example, a policy which combines the spare capacity and I/O load information of the storage system 2 may also be configured.

(3) Disaster Recovery Function of this Embodiment (3-1) Summary

The disaster recovery function according to this embodiment which is installed in the computer system 1 will be described next with reference to FIGS. 12A and 12B. Note that, in FIGS. 12A and 12B, solid lines represent the flow of data and dashed lines represent the flow of control information.

FIG. 12A show the operation during normal times of the computer system 1 according to this embodiment. During normal times, each of the users (A, B) use the application program 70 installed in their own respective mobile devices 3 to access the primary storage system 2 ("S1") of the files or directories and perform I/O on the primary data of the files or directories ("/home/A", "/home/B") which the user possesses access rights to (S1).

If a primary file or directory which is held by the primary storage system 2 is updated, the primary storage system 2 performs replication processing of the file or directory for which the storage system 2 called "S2" and the storage system 2 called "S3" which hold the secondary system of the file or directory are the replication destination (S2). The storage system 2 which holds the secondary file or directory may be automatically selected or may be manually selected.

In step S1, the access log which comprises geographical position information (GPS information) of the user when the user accesses the storage system 2 called "S1" is recorded in the access log file (not shown) which is stored in the memory 41 or the like of the mobile device 3 by the middleware 71 of the mobile device 3. The middleware 71 then transmits the foregoing access log recorded in the access log file at regular intervals to the management computer 4 (S3).

Upon receiving the access log which is transmitted at regular intervals from the middleware 71 of the mobile device 3, the information collection server program 80 of the management computer 4 stores the access log in the action history table 84 (S4).

Meanwhile, each storage system 2 transmits storage information such as its own geographical position information (GPS information), maximum capacity, current used capacity, maximum network bandwidth, and used network bandwidth at regular intervals as heart beats to the management computer 4 (S5). Further, the information collection server program 80 of the management computer 4 which receives the storage information stores the received storage information in the storage management table 86 (S6).

Incidentally, the inclusion of geographical position information of the storage system 2 in the storage information as mentioned earlier is because the storage system 2 may sometimes move. For example, Before and after the occurrence of a disaster, the installation location of the storage system 2 may be changed. Further, the geographical position may change because of installation of the storage system 2 in an automobile, aircraft, or ship, the installation location may be changed in response to a sudden event, or the installation location may be changed at regular intervals according to disaster risk.

As mentioned earlier, in the computer system 1, the primary file or directory stored in the primary storage system 2 are normally replicated in the secondary storage system 2. Further, the management computer 4 normally stores the access log transmitted at regular intervals from each of the mobile devices 3 and the storage information transmitted at regular intervals from the storage system 2 in the action history table 84 and the storage management table 86.

Note that disaster recovery is performed as a disaster countermeasure and therefore the storage system 2 which holds the secondary system of a file or directory is disposed in a location which is geographically apart from (a domestic location which is a distance apart from or overseas) the storage system which holds the primary system of the file or directory or disposed in a location of different geographical characteristics (if the primary system is disposed along the coast, the secondary system is disposed in the mountains, or the like). However, with this embodiment, there are no restrictions on the positional relationship of each of the storage systems 2 respectively holding the primary system or secondary system of the file or directory. For example, in view of security, the installation position of the storage system 2 which holds the secondary system of the file or directory may be governed by the following.

(a) The secondary system of the file or directory is stored in a storage system 2 which is disposed in a location (domestically) that does not cross the border.

(b) The secondary system of the file or directory is not stored in a storage system 2 which is disposed in a specific area or country.

(c) If the secondary system of the file or directory is stored in a storage system 2 which is disposed in a specific area or country, data is encrypted.

(d) Before the secondary system of the file or directory is stored in a storage system 2 which is disposed in a specific area or country, permission is granted to issue an alert to the user.

(e) The configuration is such that the secondary system of the file or directory is stored in a storage system 2 which is disposed in a predetermined position.

In addition, the management computer 4 may record logs so that the transitions between the primary system and secondary system of the disaster recovery target file or directory whose position changes due to disaster recovery can be subsequently tracked.

Meanwhile, FIG. 12B shows the operation when the computer system 1 is subject to disaster. A description is provided hereinbelow in which, due to a disaster, a fault occurs in the storage system 2 called "S1" which holds the primary system of the file or directory called "/home/A" and "/home/B" and a storage system 2 called "S2" and a storage system 2 called "S3" which hold the secondary system of the files or directories escape the disaster.

In this case, the storage system called "S2" and the storage system called "S3" which escape the disaster transmit storage information continuously at regular intervals to the management computer 4 as heart beats (S10). Further, upon receiving storage information which is transmitted from the storage system 2 called "S2" and the storage system called "S3" respectively, the information collection server program 80 of the management computer 4 stores the received storage information in the storage management table 86 (S11).

Meanwhile, the disaster recovery control program 82 of the management computer 4 references the storage management table 86 at regular intervals and detects a fault in the storage system 2 from the fact that storage information of the storage system 2 called "S1" in which the disaster occurred has not been updated at regular intervals. Further, the disaster recovery control program 82 which detects the fault in the storage system 2 called "S1" determines the respective storage systems 2 which are to be the disaster recovery destinations of the files or directories called "/home/A" and "/home/B" in which the storage systems 2 hold the primary data on the basis of information which is stored in the action history table 84, the disaster recovery management table 85 and the storage management table 86 respectively (S12).

More specifically, the disaster recovery control program 82 first searches the disaster recovery management table 85 for a storage system 2 which respectively holds the secondary system for the files or directories called "/home/A" and "/home/B" in which the storage system 2 called "S1" holds primary data from the disaster recovery management table 85.

Upon detecting the fact that both the secondary system of the file or directory called "/home/A" and the secondary system of the file or directory called "/home/B" are respectively held in both the storage system 2 called "S2" and the storage system 2 called "S3", the disaster recovery control program 82 focuses on one file or directory (hereinafter called "/home/A") and searches the action history table 84 for a user who has frequency accessed the file or directory.

Upon detecting that the user which has frequently accessed the file or directory called "/home/A" is "A", the disaster recovery control program 82 then acquires geographical position information (GPS information) in a fixed period of the user known as "A" from the action history table 84, and acquires position information (GPS information) of the storage system 2 called "S2" and the storage system 2 called "S3"

which hold the data of the secondary system of the file or directory called "/home/A" from the storage management table 86. Further, the disaster recovery control program 82 calculates whether any storage system 2 among the two storage systems 2 is disposed near the user known as "A".

Upon detecting that one of the storage systems 2 called "S2" is disposed near the user known as "A" as a result of this calculation, the disaster recovery control program 82 decides to switch the primary system to the storage system 2 called "S2" for the file or directory called "/home/A". Further, as above, the disaster recovery control program 82 decides to switch the primary system to the storage system 2 called "S3" for the file or directory called "/home/B".

Thereafter, the disaster recovery control program 82 notifies the storage system 2 called "S2" that the file or directory called "/home/A" is to be switched to the primary system (S13). Similarly, the disaster recovery control program 82 notifies the storage system 2 called "S3" that the file or directory called "/home/B" is to be switched to the primary system (S13). The disaster recovery control program 82 respectively switches the writing of the information of the primary system field and the secondary system field in the disaster recovery management table 85 to post disaster recovery information.

Meanwhile, the storage system 2 called "S2" which receives this notification switches the file or directory called "/home/A" to the primary system on the basis of this notification. Similarly, the storage system 2 called "S3" which receives this notification switches the file or directory called "/home/B" to the primary system on the basis of this notification (S14).

Subsequently, when the user known as "A" is going to use the application program 70 of the mobile device 3 to access the file or directory called "/home/A", the middleware 71 realizes access to the storage system 2 called "S1" is impossible. Thus, the middleware 71 issues an inquiry at this time to the location server program 81 of the management computer 4 regarding the storage system 2 which holds the primary system of the file or directory called "/home/A". A case where the user known as "B" is going to use the application program 70 of the mobile device 3 to access the file or directory called "/home/B" is also similar (S15).

Further, the middleware 71 of the mobile device 3 of the user known as "A" recognizes that the primary system of the file or directory called "/home/A" is held in the storage system 2 called "S2" as a result of a reply from the location server program 81 of the management computer 4 and accesses the storage system 2 called "S2". A case where the user known as "B" accesses the file or directory called "/home/B" is also similar (S16).

As a result of the foregoing process flow, the files or directories which are ordinarily accessed by the users are subjected to disaster recovery to the storage system 2 nearest to the users and it is possible to suppress a worsening of access latency after executing disaster recovery.

Note that, in the foregoing example, a case was described where, as a result of referencing the update date and time of the storage management table 86, the disaster recovery control program 82 of the management computer 4 detects a fault in the storage system 2 called "S1", but the invention of this specification is not limited to this example. For example, a method may be adopted in which, when the user is going to access the storage system 2 called "A" from the mobile device 3, the middleware 71 of the mobile device 3 detects a fault in the storage system 2 and notifies the management computer 4. Further, a method may also be adopted in which a plurality of storage systems 2 monitor each other's viability and storage systems 2 which escape disaster notify the management computer 4 of fault information of the other storage systems 2.

(3-2) Various Processing Relating to Disaster Recovery Function According to this Embodiment The processing routine of various processing which is executed in relation to the disaster recovery according to this embodiment as described earlier will be described next.

(3-2-1) Disaster Recovery Processing

Figure 13:
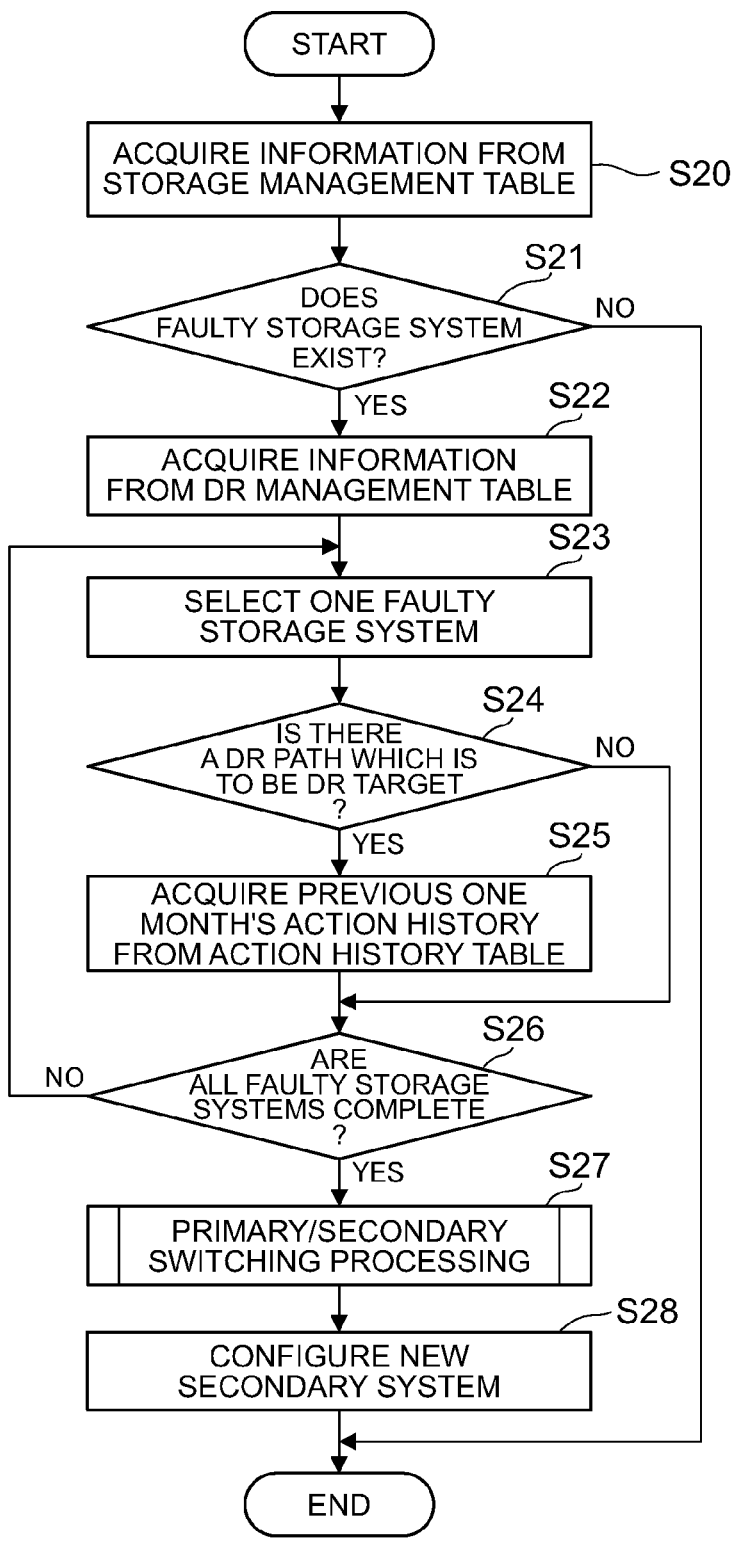
FIG. 13 is a flowchart showing a processing routine of disaster recovery processing.

FIG. 13 shows the processing routine of disaster recovery processing which is executed at regular intervals (every 10 minutes, for example) by the disaster recovery control program 82 (FIG. 7) of the management computer 4. The disaster recovery control program 82 switches the storage system 2 which holds data of the secondary system of the file or directory to the storage system 2 of the primary system for the file or directory if a fault arises in the storage system 2 which holds the data of the primary system of the file or directory in accordance with the processing routine shown in FIG. 13.

In reality, upon starting the disaster recovery processing, the disaster recovery control program 82 first reads the storage management table 86 (FIG. 10) (S20).

The disaster recovery control program 82 then determines whether a storage system 2 in which a fault has occurred (hereinafter called a faulty storage system) exists on the basis of the storage management table 86 read in step S20 (S21). As a method for determining whether a fault has occurred in a storage system 2, a method can be adopted in which only update times which are stored in the update time field 86B (FIG. 10) of each entry in the storage management table 86 are read, the read update times are compared with the current time, and the storage system 2 which corresponds to an entry for which the update time has not been updated for a fixed time (for 10 minutes, for example) is determined as a faulty storage system 2, for example.

Further, upon obtaining a negative result in the determination of step S21 (S21: NO), the disaster recovery control program 82 ends the disaster recovery processing. However, if a positive result is obtained in step S21 (S21: YES), the disaster recovery control program 82 reads the disaster recovery management table 85 (FIG. 9) (S22).

The disaster recovery control program 82 then selects one faulty storage system 2 from among the faulty storage systems 2 detected in step S21 (S23), and determines, for the selected faulty storage system 2, whether disaster recovery paths which are to be disaster recovery targets exist on the basis of the disaster recovery management table 85 which is read in step S22 (S24). Note that, as the method of extracting the disaster recovery paths which are to be disaster recovery targets, a method can be adopted in which a search is performed, among the entries of the disaster recovery management table 85, for entries in which the storage system IDs of the faulty storage systems 2 selected in step S21 are stored in the primary system field 85B (FIG. 9), and in which disaster recovery paths corresponding to the entries detected by this search are taken as disaster recovery targets.

Further, upon obtaining a negative result in the determination of step S24 (S24: NO), the disaster recovery control program 82 advances to step S26. However, when an affirmative result is obtained in the determination of step S24 (S24: YES), the disaster recovery control program 82 acquires action history information relating to disaster recovery paths which are to be disaster recovery targets detected in step S24 from among the action history information (information of each entry in the action history table 84) of a previous predetermined period (one month, for example) which is registered in the action history table 84 (FIG. 8) (S25). More specifically, the disaster recovery control program 82 extracts all the entries for which all disaster recovery paths which are to be disaster recovery targets detected in step S24 stored in the access path field 84D (FIG. 8) from among the entries in the action history table 84 are extracted and the information of all the extracted entries is acquired.

Thereafter, the disaster recovery control program 82 determines whether the processing of steps S24 and S25 has been executed for all the faulty storage systems 2 detected in step S21 (S26). Further, upon obtaining a negative result in this determination (S26: NO), the disaster recovery control program 82 returns to step S23, and then repeats the processing of steps S23 to S26 while sequentially changing the faulty storage systems 2 selected in step S23 to unprocessed faulty storage systems 2.

Further, upon obtaining an affirmative result in step S26 by ending the execution of the processing of steps S24 and S25 for all the faulty storage systems 2 already detected in step S21 (S26: YES), the disaster recovery control program 82 selects one storage system 2 from among the storage systems 2 which hold data of the secondary system of the corresponding file or directory in accordance with a policy which is configured for each of the disaster recovery paths detected in step S24, and executes primary/secondary switching processing to switch the file or directory held in the storage system 2 to the primary system (S27).

The disaster recovery control program 82 then configures a new storage system 2 which holds data of the secondary system of the file or directory for each file or directory which is switched to the primary system in the primary/secondary switching processing of step S27 (the files or directories which respectively correspond to each of the disaster recovery paths detected in step S24) (S28).

More specifically, the disaster recovery control program 82 acquires the used capacity and used network bandwidth of the file or directory from the disaster recovery management table 85 (FIG. 9) for each file or directory switched to the primary system in the primary/secondary switching processing of step S27, and then references the storage management table 86 (FIG. 10) and selects one or more storage systems 2 for which the maximum capacity is not exceeded even when the used capacity of the file or directory is added to the current used capacity, the maximum network bandwidth is not exceeded even when the used network bandwidth of the file or directory is added to the current used network bandwidth, for which the primary system of the file or directory is not held, and which is not a faulty storage system 2. Note that, if a multiplicity of storage systems 2 which fulfill these conditions exist (storage systems 2 which could serve as candidates for storage systems 2 which hold new secondary data), a storage system 2 which is geographically nearby to the corresponding faulty storage system 2 may also be selected or a random selection may be made, for example. In the calculation of this distance, a distance calculation system which is described subsequently is used for step S45 in FIG. 15, for example.

Further, the disaster recovery control program 82 stores, for each file or directory switched to the primary system in the primary/secondary switching processing of step S27, the storage system ID of the storage system 2 where the file or directory of the secondary system selected as described above is to be held in the secondary system field 85C of the corresponding entry in the disaster recovery management table 85 (FIG. 9).

Further, the disaster recovery control program 82 then ends the disaster recovery processing.

(3-2-2) Primary/Secondary Switching Processing

Figure 14:
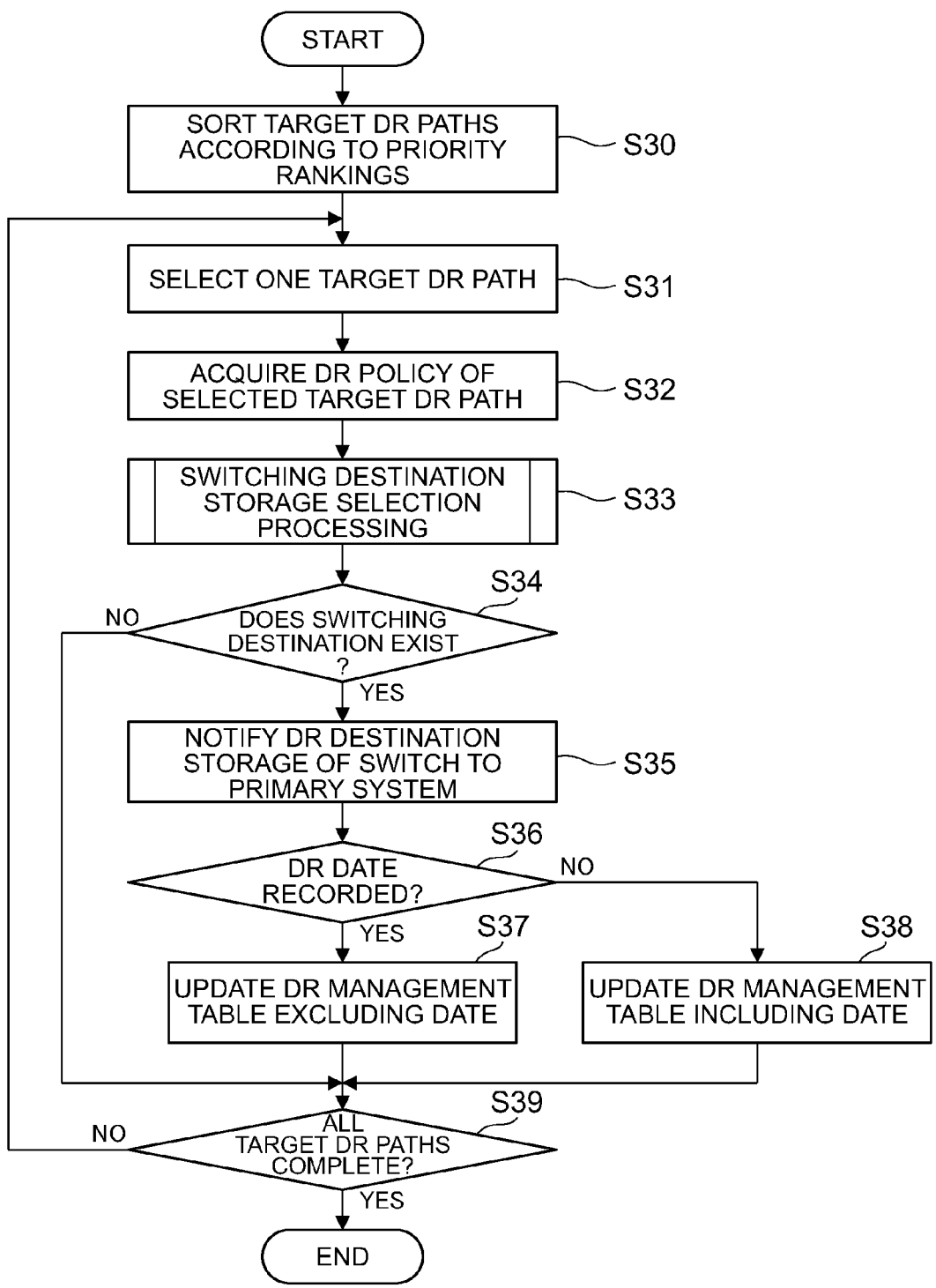
FIG. 14 is a flowchart showing a processing routine of primary/secondary switching processing.

FIG. 14 shows a specific processing routine for primary/secondary switching processing which is executed by the disaster recovery control program 82 in step S27 of the foregoing disaster recovery processing of FIG. 13 or which is executed by the location optimization program 83 (FIG. 7) in step S56 of the location optimization processing described subsequently with reference to FIG. 16.

The disaster recovery control program 82 or the location optimization program 83 starts this primary/secondary switching processing upon advancing to step S27 of the disaster recovery processing or step S56 of the location optimization processing and first references the disaster recovery management table 85 (FIG. 9) and sorts each of the disaster recovery paths which are to be targets of the primary/secondary switching processing in order of priorities (starting with the smallest numerical value for the priority) which are configured for the respective disaster recovery paths (S30).

Note that the "each disaster recovery path which is to be a primary/secondary switching processing target" is each disaster recovery path of a disaster recovery target detected in step S24 of the disaster recovery processing or is each disaster recovery path of the relocation target detected in step S53 of the relocation optimization processing and is referred to hereinbelow as a target disaster recovery path.

The disaster recovery control program 82 or the location optimization program 83 then selects one disaster recovery path with the highest priority from among the target disaster recovery paths (S31) and acquires a policy which has been configured for the selected disaster recovery path from the policy management table 87 (FIG. 11) (S32).

More specifically, the disaster recovery control program 82 acquires the policy ID of a policy which is configured for the disaster recovery path selected in step S24 from the information of the disaster recovery management table 85 acquired in step S22 of the disaster recovery processing (FIG. 13) and performs acquisition by reading the content of the corresponding policy from the policy management table 87 on the basis of the acquired policy ID. Similarly, the location optimization program 83 acquires the policy ID of the policy configured for the disaster recovery path selected in step S53 from the information of the disaster recovery management table 85 acquired in step S50 of the location optimization processing (FIG. 16) described subsequently, and performs acquisition by reading the content of the corresponding policy from the policy management table 87 on the basis of the acquired policy ID.

The disaster recovery control program 82 or location optimization program 83 then executes switching destination storage apparatus selection processing to select a storage system 2 for switching a file or directory to the primary system from among the storage systems 2 which hold the data of the secondary system of the file or directory corresponding to the target disaster recovery path on the basis of the action history information relating to the target disaster recovery path acquired in step S25 of the disaster recovery processing (FIG. 13) or in step S54 of the location optimization processing in accordance with the policy acquired in step S32 (S33). Note that, at the time of location optimization processing, because the optimal position is determined including the primary system and secondary system as described earlier, in step S33, it is also possible to determine that a storage system 2 capable of switching the file or directory of the secondary system corresponding to the target disaster recovery path to the primary system cannot be selected (that is, the current primary system is optimal).

Thereafter, the disaster recovery control program 82 or location optimization program 83 determines whether it is not possible to select a storage system 2 which is capable of serving as the primary system switching destination in step S33 (S34), and, upon obtaining a negative result in this step S34 (S34: NO), the disaster recovery control program 82 or the location optimization program 83 advances to step S39.

However, if an affirmative result is obtained in this determination of step S34 (S34: YES), the disaster recovery control program 82 or location optimization program 83 issues an instruction to switch the secondary system of the file or directory corresponding to the target disaster recovery path held by the storage system 2 to the primary system to all the storage systems 2 which were selected in step S33 (S35). Thus, the storage system 2 which receives this instruction switches the file or directory to the primary system. More specifically, the storage system 2 changes the configuration for the file or directory for which access has thus far been denied so that the user possessing access rights is granted access to the file or directory.

The disaster recovery control program 82 or location optimization program 83 then determines whether a date for implementing disaster recovery processing has been pre-stored in the disaster recovery date field 85E (FIG. 9) of the entry corresponding to the target disaster recovery path (the disaster recovery path selected in step S31) which was switched from the secondary system to the primary system in step S35 among the entries in the disaster recovery management table 85 (FIG. 9) (S36). Note that, if the subject of the primary/secondary switching processing is the disaster recovery control program 82, a negative result must be obtained in step S36 and that, if the processing subject of the primary/secondary switching processing is the location optimization program 83, an affirmative result must be obtained in step S36.

Further, if a affirmative result is obtained in step S36 (S36: YES), the disaster recovery control program 82 or location optimization program 83 accordingly updates the disaster recovery management table 85 (S37). More specifically, in step S37, the storage system ID which is stored in the primary system field 85B (FIG. 9) of the entry corresponding to the target disaster recovery path which was switched from the secondary system to the primary system in step S35 among the entries in the disaster recovery management table 85 is updated to the storage system ID of the storage system 2 selected in step S33.

However, if a negative result is obtained in step S36 (S36: NO), the disaster recovery control program 82 or location optimization program 83 accordingly updates the disaster recovery management table 85 (S38). More specifically, in step S38, the storage system ID which is stored in the primary system field 85B (FIG. 9) of the entry corresponding to the target disaster recovery path which is switched from the secondary system to the primary system in step S35 among the entries in the disaster recovery management table 85 is updated to the storage system ID of the storage system 2 selected in step S33, and the date which is stored in the disaster recovery date field 85E for this entry is updated to the current date.

The disaster recovery control program 82 or location optimization program 83 then determines whether execution of the processing of steps S31 to S38 is complete for all the target disaster recovery paths (S39). Further, the disaster recovery control program 82 or location optimization program 83 returns to step S31 when a negative result is obtained in this determination and subsequently repeats the processing of steps S31 to S39 while sequentially changing the target disaster recovery path selected in step S31 to another unprocessed target disaster recovery path (S39: NO).

Further, the disaster recovery control program 82 or location optimization program 83 ends the primary/secondary switching processing when an affirmative result is obtained in step S39 as a result of execution of the processing of steps S31 to S38 being complete for all the target disaster recovery paths (S39: YES).

(3-2-3) Switching Destination Storage Selection Processing

As mentioned earlier, step S33 of the primary/secondary switching processing (FIG. 14) selects a storage system 2 which switches the file or directory of the secondary system to the primary system from among the storage systems 2 which hold the data of the secondary system of the file or directory corresponding to the target disaster recovery path on the basis of action history information relating to the target disaster recovery path acquired in step S25 of the disaster recovery processing or in step S54 of the location optimization processing according to the policy acquired in step S32 of the primary/secondary switching processing.

Figure 15:
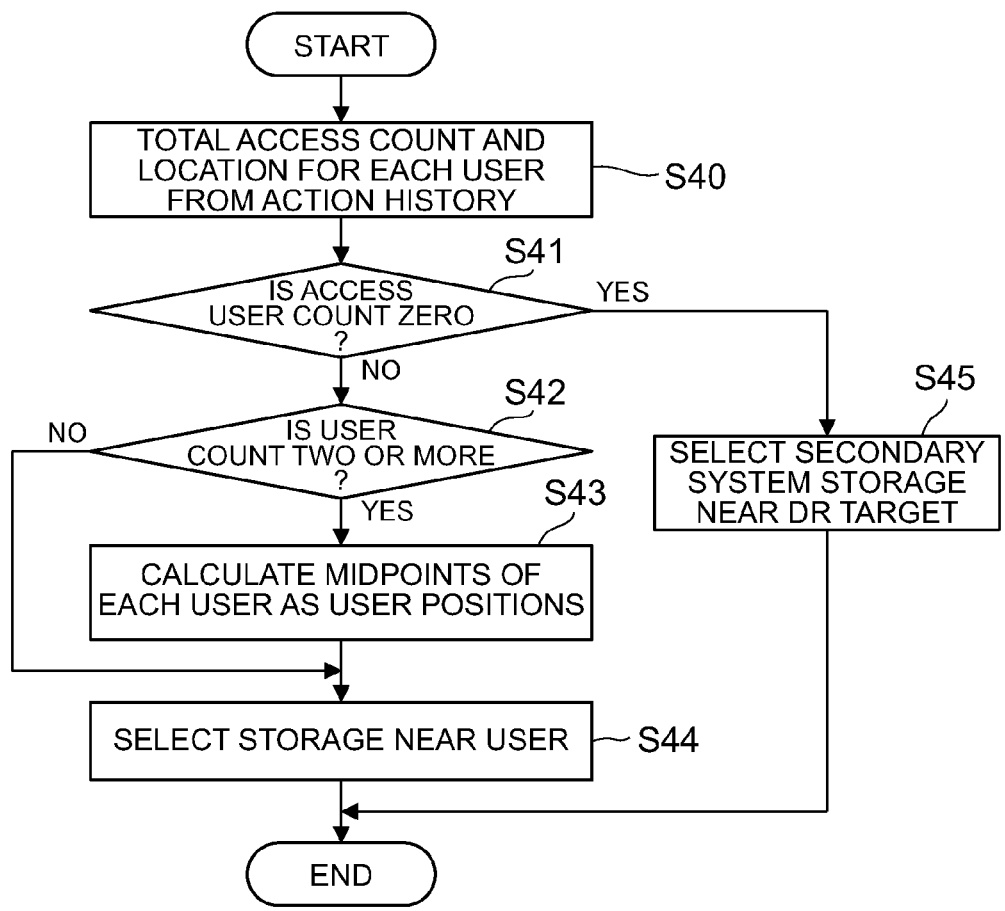
FIG. 15 is a flowchart showing a processing routine of switching destination storage selection processing.

FIG. 15 shows a specific processing routine of the switching destination storage selection processing which is executed by the disaster recovery control program 82 or the location optimization program 83 in step S33 of the primary/secondary switching processing if the policy is "P1" in FIG. 11.

In this case, upon advancing to step S33 of the primary/secondary switching processing, the disaster recovery control program 82 or the location optimization program 83 starts the switching destination storage selection processing and first totals the number of accesses per user and user positions (hereinafter called user positions) from the action history information acquired in step S25 of the disaster recovery processing, or in step S54 of the location optimization processing which will be described subsequently (S40).

More specifically, where the user position is concerned, the respective median values of the latitude and longitude of GPS information contained in the action history information (information which is stored in the GPS information field 84C (FIG. 8) of the corresponding entry in the action history table 84 (FIG. 8) are calculated for each user (mobile device 3). For example, in the case of the example of FIG. 8, the user position which is calculated for the user known as "A" has a latitude of "038.258375", which is the median value of "038.258375", "038.261620" and "038.258360", and a longitude of "140.866136" which is the median value of "140.855829", "140.866136", and "140.866200".

Thereafter, as a result of the calculation of step S40, the disaster recovery control program 82 or location optimization program 83 determines whether the user count of the users accessing the disaster recovery path which is then the target (target disaster recovery path) is "0" (S41).

Further, upon obtaining an affirmative result in this determination (S41: YES), the disaster recovery control program 82 or location optimization program 83 selects the storage system 2 which is the closest geographical distance from the storage system 2 which holds the data of the primary system of the file or directory corresponding to the target disaster recovery path (S45). Note that, as the distance calculation system for calculating the distance between storage systems 2, the distance calculation system which is disclosed in "Bowring, B. R., Total inverse solutions for the geodesic and great elliptic, Survey Review, 33, 261 (July 1996) 461 to 476", for example, can be used. Further, the disaster recovery control program 82 or location optimization program 83 subsequently completes the switching destination storage selection processing and returns to the primary/secondary switching processing.

However, upon obtaining a negative result in the determination of step S41 (S41: NO), the disaster recovery control program 82 or location optimization program 83 determines whether the user count of the users accessing the target disaster recovery path obtained in the calculation processing of step S40 is two or more (S42).

Upon obtaining a negative result in this determination (S42: NO), the disaster recovery control program 82 or location optimization program 83 then selects the storage system 2 which comprises the GPS information which is geographically closest to the user position of the user using the target disaster recovery path by means of the same method as step S45 (S44). The disaster recovery control program 82 or the location optimization program 83 subsequently completes the switching destination storage selection processing and returns to the primary/secondary switching processing.

However, if an affirmative result is obtained in the determination of step S42 (S42: YES), the disaster recovery control program 82 or location optimization program 83 calculates a midpoint for the user positions or each user using the target disaster recovery path obtained from the calculation of step S40 (S43) and selects a storage system 2 with GPS information which is geographically closest to the calculated midpoint by means of the same method as step S45 (S44). The disaster recovery control program 82 or the location optimization program 83 subsequently completes the switching destination storage selection processing and returns to the primary/secondary switching processing.

Note that, in this embodiment, the disaster recovery control program 82 or the location optimization program 83 is devised to select a storage system 2 of the secondary system which is to be switched to the primary system on the basis of the policy, the action history, and the position information of the storage system 2 but the invention of this specification is not limited to such an arrangement. For example, if the disk unused capacity and I/O load of the storage system 2 are required for the policy determination method, this information may also be collected from the storage system 2 and may be used in this determination.

Further, although, in this embodiment, the user position is simply found from the median value of the latitude and the median value of the longitude in step S40, the respective average values of the latitude and longitude of the GPS information recorded in the action history may also be used for the user position. Further, the calculation may be made by considering the great circle path instead of a simple average value. The same is also true for the calculation of the midpoints of a plurality of users in step S43.

Incidentally, FIG. 15 shows an example of the storage selection processing based on the policy called "P1" exemplified in FIG. 11 as mentioned earlier but, by changing part of the processing, storage selection processing based on the policy called "P2" which is exemplified in FIG. 11 can be realized. More specifically, the processing of step S43 may be changed to "extract the user position of the highest access count user.

(3-2-4) Location Optimization Processing

Figure 16:
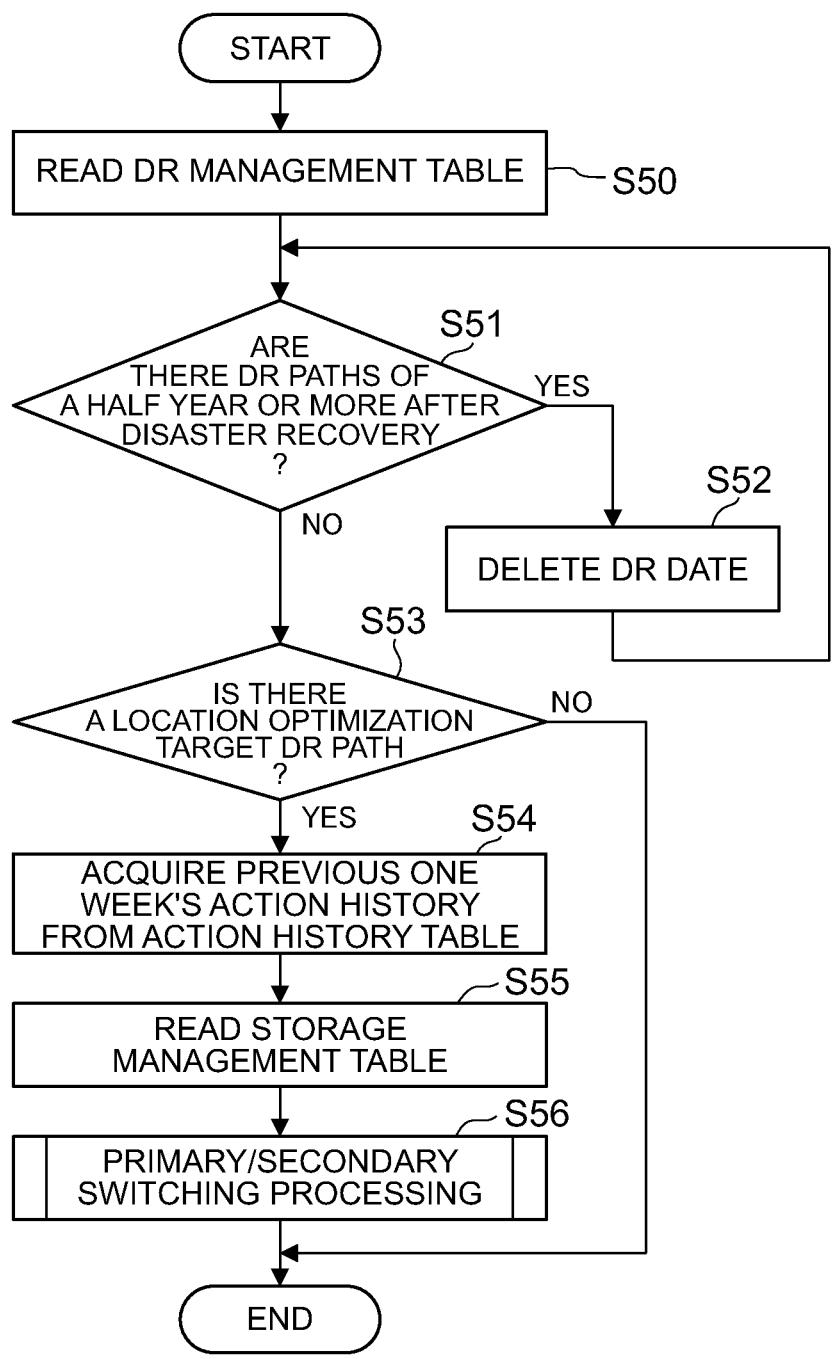
FIG. 16 is a flowchart showing a processing routine of location optimization processing.

FIG. 16 shows a processing routine of the location optimization processing which is executed at regular intervals (every 10 minutes, for example) by the location optimization program 83. The location optimization program 83 switches the file or directory which is subject to disaster recovery between the primary system and secondary system if necessary within a predetermined period (half a year, for example) according to the processing routine shown in FIG. 16.

In reality, when starting the location optimization processing, the location optimization program 83 first reads the disaster recovery management table 85 (FIG. 9) (S50), and determines whether a disaster recovery path which has elapsed for a predetermined period (a half year, for example) exists after disaster recovery by sequentially comparing the dates stored in the disaster recovery date field 85E (FIG. 9) of each entry in the read disaster recovery management table 85 with the current date (S51).

Further, when an affirmative result is obtained in this determination (S51: YES), the location optimization program 83 deletes, among the entries in the disaster recovery management table 85, the dates stored in the disaster recovery date field 85E of all the entries which respectively correspond to each disaster recovery path (that is, fixed disaster recovery path) which was detected in step S51 (S52), and then returns to step S51.

However, if a negative result is obtained in the determination of step S51 (S51: NO), the location optimization program 83 takes a disaster recovery path which corresponds to an entry in which a date is stored in the disaster recovery date field 85E among the entries in the disaster recovery management table 85 as the disaster recovery path which is to be the location optimization processing target (hereinafter called the location optimization target disaster recovery path) and determines whether such a location optimization target disaster recovery path exists (S53). Further, upon obtaining a negative result in this determination (S53: NO), the location optimization program 83 ends the location optimization processing.

However, when an affirmative result is obtained in the determination of step S53 (S53: YES), the location optimization program 83 acquires all the action history information relating to each location optimization target disaster recovery path which was detected in step S53 from among the action history information of a previous predetermined period (one week, for example) registered in the action history table 84 (FIG. 8) (S54). More specifically, the location optimization program 83 extracts all the entries in which each location optimization disaster recovery path has been stored in the access path field 84D (FIG. 8) detected in step S53 from among the entries in the action history table 84 and acquires information of all the extracted entries.

The location optimization program 83 then reads the storage management table 86 (S55), and by subsequently executing the primary/secondary switching processing illustrated earlier in FIG. 14, switches the file or directory subjected to disaster recovery within a predetermined period (a half year, for example) between the primary system and secondary system of the file or directory as necessary (S56). Further, the location optimization program 83 subsequently ends the location optimization processing.

Note that, although the action history corresponding to the previous week is read from the action history table 84 in step S54, the invention of this specification is not limited to this period. For example, a shorter period of the previous three days or a longer period of the previous two weeks is acceptable. By configuring a period shorter than the action history period which is read in step S25 of FIG. 13, the anticipated movement of the user after a disaster occurs can be carefully dealt with.

(4) Disaster Recovery Configuration Window

Figure 17:
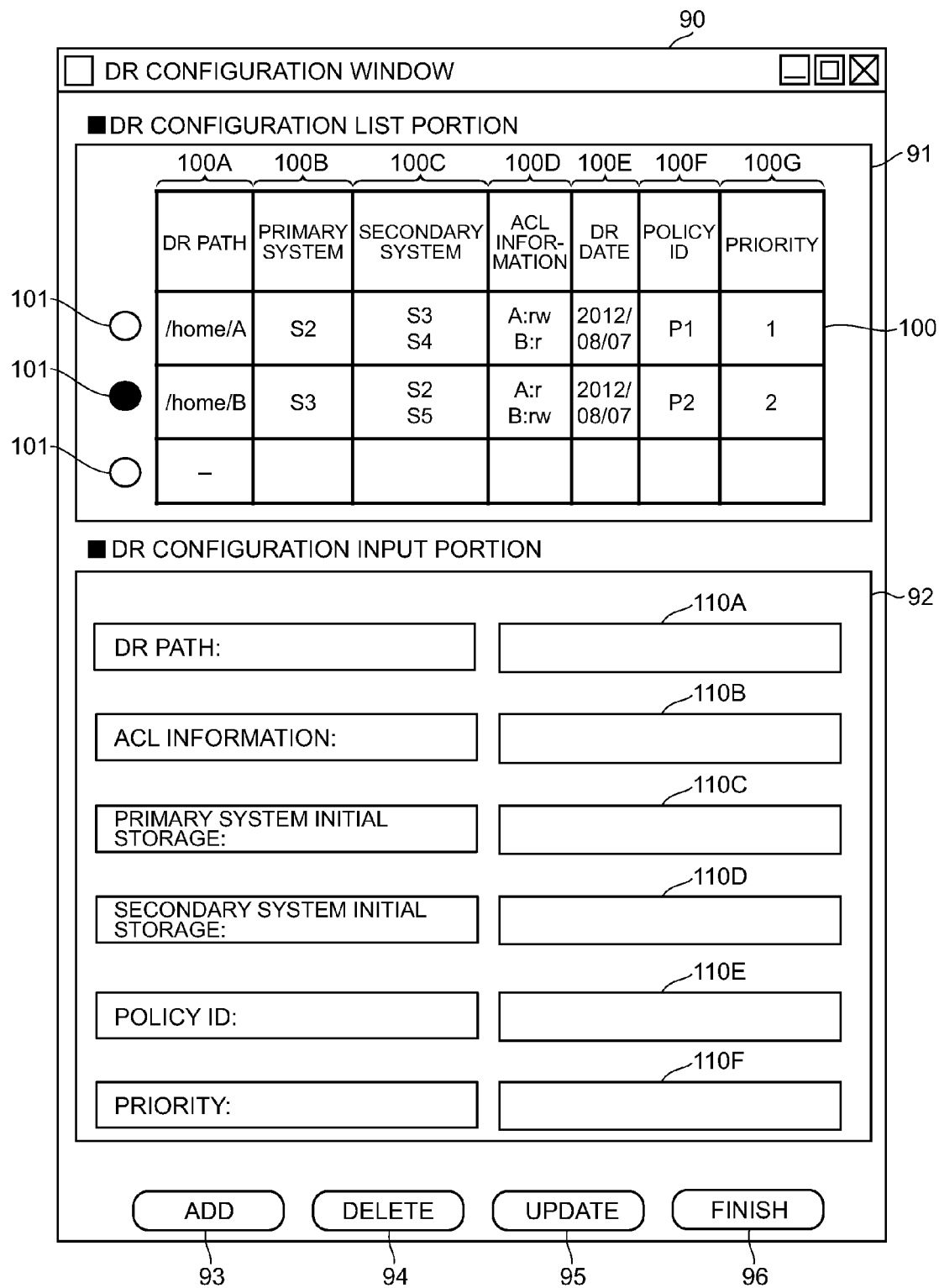
FIG. 17 is a schematic diagram which schematically shows the configuration of a disaster recovery configuration window.

FIG. 17 shows a configuration example of a disaster recovery configuration window 90 which is displayed by the management computer 4 by means of a predetermined operation. The disaster recovery configuration window 90 is a GUI (Graphical User Interface) for making various settings relating to a disaster recovery function according to the foregoing embodiment and is configured from a disaster recovery configuration list portion 91, a disaster recovery configuration input portion 92, an add button 93, a delete button 94, an update button 95, and a finish button 96.

Further, the disaster recovery configuration list portion 91 displays a configuration list 100 which shows a portion of the information which is stored in the disaster recovery management table 85 (FIG. 9) which is held in the memory 51 (FIG. 4) of the management computer 4. More specifically, the configuration list portion 100 comprises a disaster recovery path field 100A, a primary system field 100B, a secondary system field 100C, an ACL information field 100D, a policy ID field 100F, and a priority field 100G, and, within each of the fields 100A to 100G, information which is stored in the disaster recovery path field 85A, the primary system field 85B, the secondary system field 85C, the ACL information field 85D, the disaster recovery date field 85E, the policy ID field 85F, and the priority field 85G of each entry in the disaster recovery management table 85 mentioned earlier with reference to FIG. 9.

In addition, the disaster recovery configuration list portion 91 displays a plurality of radio buttons 101 which are associated with each of the entries of the configuration list 100. Further, in the disaster recovery configuration window 90, by clicking the radio button 101 associated with the desired file or directory from among the radio buttons 101, the file or directory can be selected. Further, the radio button 101 which is associated with the selected file or directory at this time is displayed ON (displayed as a black circle in FIG. 17).

Meanwhile, the disaster recovery configuration input portion 92 comprises a disaster recovery path input field 110A, an ACL information input field 110B, a primary system initial location destination storage system ID field 110C, a secondary system initial location destination storage system ID field 110D, a policy ID field 110E, and a priority field 110F.

Further, in the disaster recovery configuration window 90, by selecting the desired file or directory by causing the desired radio button 101 to be displayed as ON in the disaster recovery configuration list portion 91, the disaster recovery path of the file or directory, ACL information configured for the file or directory, the storage system ID of the storage system 2 which holds the data of the primary system of the file or directory, the storage system ID of the storage system which holds the data of the secondary system of the file or directory, and the policy ID of the policy configured for the file or directory respectively can be displayed in the corresponding configuration input fields 110A to 110F of the disaster recovery configuration input portions 92.

In addition, in the disaster recovery configuration window 90, by clicking the update button 95 after rewriting the desired information among the information which is displayed in each of the configuration input fields 110A to 110F in the disaster recovery configuration input portion 92 in this way, information relating to the file or directory can be updated. In this case, when the update button 95 is clicked, information which is displayed in each of the fields 110A to 110F of the disaster recovery configuration input portion 92 is captured and each of the corresponding fields 85A to 85G of the disaster recovery management table 85 (FIG. 9) are updated on the basis of the captured information.

In addition, in the disaster recovery configuration window 90, by clicking the add button 93 after respectively inputting, for the desired file or directory, ACL information, the storage system ID of the storage system 2 holding the data of the primary system, the storage system ID of the storage system 2 holding the data of the secondary system of the file or directory, and the policy ID of the policy when the file or directory undergoes disaster recovery to the corresponding configuration input fields 110A to 110F in the input portion the disaster recovery path, this information can be configured as units when performing disaster recovery on the file or directory. Information relating to the file or directory which is the new disaster recovery unit configured at this time is then additionally registered in the disaster recovery management table 85. Note that the disaster recovery date field 85E of the entry corresponding to the additionally registered file or directory in the disaster recovery management table 85 initially remains blank.

In addition, in the disaster recovery configuration window 90, by clicking the delete button 94 after selecting the desired file or directory by clicking the corresponding radio button 101 in the disaster recovery configuration list portion 91, it is possible to perform deletion from the units when the file or directory undergoes disaster recovery. Further, among the entries of the configuration list 100, the entry relating to the file or directory is deleted and the entry corresponding to the file or directory among the entries in the disaster recovery management table 85 is also deleted.

In addition, in the disaster recovery configuration window 90, disaster recovery-related configuration can be completed by clicking the finish button 96 and the disaster recovery configuration window 90 can be closed.

Note that, as shown in FIG. 17, in this embodiment, the priority of the file or directory, which is the unit when disaster recovery is performed, is configured manually by being input to the priority configuration input portion 110F of the disaster recovery configuration input portion 92, but this specification is not limited to such a configuration. For example, the priority may be automatically configured according to the content of the ACL information. In addition, a disaster recovery path may be automatically configured with a high priority for a file or directory with a high frequency of access by the user.

(5) Advantageous Effects of Embodiment

As mentioned earlier, in the computer system 1 according to this embodiment, position information of each storage system 2 and each mobile device 3 can be respectively acquired and disaster recovery is executed in file or directory units on the basis of the position information and policy, and hence data can be subjected to disaster recovery in the optimal storage system 2 in file or directory units. In this way, it is possible, depending on the policy configuration, to effectively prevent a drop in the service quality of the data communication service after disaster recovery and/or situations from arising where users are unable to access the services themselves.

(6) Further Embodiments

Note that, in the above embodiment, a case was described in which the present invention is applied to the computer system 1 which is configured as per FIG. 1, but the present invention is not limited to such a case, rather, the present invention can be applied widely to computer systems with various other configurations.

Further, in the foregoing embodiment, a case was described in which files or directories are taken as the execution units of disaster recovery, but the present invention is not limited to such a case, for example units of a finer or coarser granularity than a file or directory may be the execution units of disaster recovery. For example, striping file chunks obtained by dividing individual files into smaller chunks and saving same may be execution units of disaster recovery.

In addition, in the above embodiment, a case where a storage system 2 is applied as a storage apparatus for holding data of the mobile devices 3 was described, but this specification is not limited to such a case, rather, a general-purpose computer may also be adopted as the storage apparatus. Likewise, in the above embodiment, a case where the mobile devices 3 are adopted as communication terminals was described, but the present invention is not limited to such a case, rather, a general-purpose computer, for example, may be adopted as this communication terminal.

Moreover, in the above embodiment, a case was described where the information collection portion, which collects the position information of the plurality of storage systems 2 and the mobile device 3, is configured from the CPU 50 and the information collection server program 80 of the management computer 4, the disaster recovery controller, which monitors the existence of faults in the storage systems 2 which hold the data of files or directories of a primary system and, upon detecting a fault in the storage systems 2, issues an instruction to the storage system 2 which holds the data of a secondary system of a file or directory which is a replication of the data of the file or directory of the primary system to execute disaster recovery processing to switch the data of the secondary system of the file or directory to the primary system, is configured from the CPU 50 and the disaster recovery control program 82 of the management computer 4, the location optimization portion, which executes location optimization processing which verifies, at regular intervals, whether the location of the data of the file or directory executed by the disaster recovery processing is optimal, and which issues an instruction to the corresponding storage system 2 to switch between the primary system and secondary system of the file or directory as necessary, is configured by the CPU 50 and the location optimization program 83 of the management computer 4, but the present invention is not limited to such a case, rather, the information collection portion, the disaster recovery controller, and the location optimization portion may be configured as separate apparatuses, for example, and various other configurations can be widely applied as the configurations of the information collection portion, disaster recovery controller, and location optimization portion.

INDUSTRIAL APPLICABILITY

The present invention can be applied to a management apparatus which manages a computer system which comprises a plurality of storage apparatuses and which replicates and holds data, which is stored by a communication terminal in the storage apparatuses, in one or more of the other storage apparatuses in units of this data.

REFERENCE SIGNS LIST

1 Computer system
2 Storage system
3 Mobile device
4 Management computer
5 Network
11 Storage head
12 Storage apparatus
20, 40, 50 CPU
24, 46 GPS receiver
31 Storage device
32 Storage controller
54 Display device
80 Information collection server program
81 Location server program
82 Disaster recovery control program
83 Location optimization program
84 Action history table
85 Disaster recovery management table
86 Storage management table
87 Policy management table
90 Disaster recovery configuration window

The invention claimed is:

1. A management apparatus for managing a computer system which comprises a plurality of storage apparatuses and which replicates and holds data which is stored by a communication terminal in the storage apparatuses, in one or more of the other storage apparatuses, the management apparatus comprising:

an information collection portion configured to collect physical position information of the plurality of storage apparatuses and the communication terminal, a disaster recovery controller configured to monitor the existence of faults in the storage apparatuses which hold data of a primary system and, upon detecting a fault in the storage apparatuses, issue an instruction to a storage apparatus which holds data of a secondary system which is a replication of the data of the primary system to execute disaster recovery processing to switch the data of the secondary system to the primary system; and a location optimization portion configured to execute location optimization processing which verifies, at regular intervals, whether the location of the data executed by the disaster recovery processing is optimal, and which issues an instruction to the corresponding storage apparatus to switch between the primary system and secondary system of the data as necessary, wherein:

at the time of the disaster recovery processing, the disaster recovery controller is configured to select the storage apparatus for which the data of the secondary system is to be switched to the primary system from among the storage apparatuses which hold the data of the secondary system on the basis of physical position information in a first predetermined period among the physical position information of the communication terminal collected by the information collection portion, and a policy which has been preconfigured for the data, and issue an instruction to the selected storage apparatus to switch the data of the secondary system held by the selected storage apparatus to the primary system, and at the time of the location optimization processing, the location optimization portion is configured to select the storage apparatus for which the data of the secondary system is to be switched to the primary system from among the storage apparatuses which hold the data of the secondary system on the basis of physical position information in a second predetermined period among the physical position information of the communication terminal collected by the information collection portion, and a policy which has been preconfigured for each of the data, issue an instruction to the selected storage apparatus to switch the data of the secondary system held by the selected storage apparatus to the primary system, and issue an instruction to a particular storage apparatus which holds the data of the primary system to switch the data of the primary system held by the particular storage apparatus to the secondary system.

2. The management apparatus according to claim 1, wherein the second predetermined period is a period after the disaster recovery processing.

3. The management apparatus according to claim 1, wherein the second predetermined period is shorter than the first predetermined period.

4. The management apparatus according to claim 1, wherein the location optimization portion is configured to execute the location optimization processing on the data executed by the disaster recovery processing within a third predetermined period.

5. The management apparatus according to claim 4, wherein, when a plurality of storage apparatuses which are able to serve as a replication destination of the data switched to the primary system exist, the disaster recovery controller is configured to select the replication destination of the data on the basis of the physical position information which is collected in a second predetermined period among the physical position information of the communication terminal which is collected by the information collection portion on the basis of the physical position information of each of the storage apparatuses.

6. A management apparatus for managing a computer system which comprises a plurality of storage apparatuses and which replicates and holds data, which is stored by a communication terminal in the storage apparatuses, in one or more of the other storage apparatuses, the management apparatus comprising:
an information collection portion configured to collect physical position information of the plurality of storage apparatuses and the communication terminal; and
a disaster recovery controller configured to monitor the existence of faults in the storage apparatuses which hold data of a primary system and, upon detecting a fault in the storage apparatuses, issue an instruction to a storage apparatus which holds data of a secondary system which is a replication of the data of the primary system to execute disaster recovery processing to switch the data of the secondary system to the primary system, wherein:
at the time of the disaster recovery processing, the disaster recovery controller is configured to select the storage apparatus for which the data of the secondary system is to be switched to the primary system from among the storage apparatuses which hold the data of the secondary system on the basis of physical position information in a first predetermined period among the physical position information of the communication terminal collected by the information collection portion, and a policy which has been preconfigured for the data, and issue an instruction to the selected storage apparatus to switch the data of the secondary system held by the selected storage apparatus to the primary system, and
when there are a plurality of communication terminals using the data, the disaster recovery controller is configured to select the storage apparatus, which is closest to a midpoint of the plurality of communication terminals among the storage apparatuses which hold the data of the secondary system, as the storage apparatus for which the data of the secondary system is to be switched to the primary system, on the basis of physical position information of each of the communication terminals within the first predetermined period.

7. The management apparatus according to claim 6, wherein the disaster recovery controller is configured to select the storage apparatus which is to be the replication destination of the data which has been switched to the primary system as a result of the disaster recovery processing on the basis of a maximum capacity, a currently used capacity, a usable maximum network bandwidth, and a currently used network bandwidth, of each of the storage apparatuses.

8. The management apparatus according to claim 7, wherein, when a plurality of storage apparatuses which are able to serve as the replication destination of the data which has been switched to the primary system exist, the disaster recovery controller is configured to select, as the replication destination of the data the storage apparatus which is geographically near a storage apparatus in which a fault occurred, holding the data of a source primary system on the basis of the physical position information of each of the storage apparatuses.

9. The management apparatus according to claim 6, wherein priorities are respectively configured for each of the data, and
wherein the disaster recovery controller is configured to sequentially execute the disaster recovery processing in order starting with the data of a high priority.

10. The management apparatus according to claim 6, wherein the data is a file or directory.

11. The management apparatus according to claim 6, wherein the policy includes one or more selected from the group consisting of:
a first policy for selecting the storage apparatus near the communication terminal among the storage apparatuses holding the data of the secondary system as the storage apparatus which switches the data of the secondary system to the primary system;
a second policy for selecting the storage apparatus near the communication terminal of a high access frequency among the storage apparatuses holding the data of the secondary system as the storage apparatus which switches the data of the secondary system to the primary system; and
a third policy for selecting a predefined storage apparatus among the storage apparatuses holding the data of the secondary system as the storage apparatus which switches the data of the secondary system to the primary system are defined.

12. A management method executed by a management apparatus which manages a computer system which comprises a plurality of storage apparatuses and which replicates and holds data, which is stored by a communication terminal in the storage apparatuses, in one or more of the other storage apparatuses, the management method comprising:
a first step of collecting, by the management apparatus, physical position information of the plurality of storage apparatuses and the communication terminal; and
a second step of monitoring, by the management apparatus, the existence of faults in the storage apparatuses which hold data of a primary system and, upon detecting a fault in the storage apparatuses, issuing an instruction to a storage apparatus which holds data of a secondary system which is a replication of the data of the primary system to execute disaster recovery processing to switch the data of the secondary system to the primary system,
wherein, the second step includes:
selecting, at the time of the disaster recovery processing and by the management apparatus, the storage apparatus for which the data of the secondary system is to be switched to the primary system from among the storage apparatuses which hold the data of the secondary system on the basis of physical position information in a first predetermined period among the collected physical position information of the communication terminals, and a policy which has been preconfigured for the data,
issuing an instruction to the selected storage apparatus to switch the data of the secondary system held by the selected storage apparatus to the primary system, and
selecting, when there are a plurality of communication terminals using the data, the storage apparatus, which is closest to a midpoint of the plurality of communication terminals among the storage apparatuses which hold the data of the secondary system, as the storage apparatus for which the data of the secondary system is to be switched to the primary system, on the basis of physical position information of each of the communication terminals within the first predetermined period.

13. The management method according to claim 12, wherein the second step includes selecting the storage apparatus which is to be the replication destination of the data which has been switched to the primary system as a result of the disaster recovery processing on the basis of a maximum capacity, a currently used capacity, a usable maximum network bandwidth, and a currently used network bandwidth, of each of the storage apparatuses.

14. The management method according to claim 13, wherein the second step includes selecting, when a plurality of storage apparatuses which are able to serve as the replication destination of the data which has been switched to the primary system exist, as the replication destination of the data, the storage apparatus which is geographically near a storage apparatus, in which a fault occurred, holding the data of a source primary system on the basis of the physical position information of each of the storage apparatuses.

15. The management method according to claim 12, wherein:
priorities are respectively configured for each of the data, and
the second step includes sequentially executing the disaster recovery processing in order starting with the data of a high priority.

16. The management method according to claim 12, wherein the data is a file or directory.

17. The management method according to claim 12, wherein the policy includes one or more selected from the group consisting of:
a first policy for selecting the storage apparatus near the communication terminal among the storage apparatuses holding the data of the secondary system as the storage apparatus which switches the data of the secondary system to the primary system;
a second policy for selecting the storage apparatus near the communication terminal of a high access frequency among the storage apparatuses holding the data of the secondary system as the storage apparatus which switches the data of the secondary system to the primary system; and
a third policy for selecting a predefined storage apparatus among the storage apparatuses holding the data of the secondary system as the storage apparatus which switches the data of the secondary system to the primary system are defined.

\* \* \* \* \*